US012775283B2

(12) United States Patent
Izumihara et al.

(10) Patent No.: US 12,775,283 B2
(45) Date of Patent: Oct. 27, 2026

(54) DATA PROCESSING METHOD, DATA PROCESSING DEVICE, PROGRAM, AND MOVING BODY CONTROL SYSTEM

(71) Applicant: Sony Group Corporation, Tokyo (JP)

(72) Inventors: Atsushi Izumihara, Tokyo (JP); Naoki Uchida, Tokyo (JP)

(73) Assignee: Sony Group Corporation, Tokyo (JP)

( * ) Notice: Subject to any disclaimer, the term of this patent is extended or adjusted under 35 U.S.C. 154(b) by 72 days.

(21) Appl. No.: 18/845,919

(22) PCT Filed: Mar. 13, 2023

(86) PCT No.: PCT/JP2023/009499
§ 371 (c)(1),
(2) Date: Sep. 11, 2024

(87) PCT Pub. No.: WO2023/189455
PCT Pub. Date: Oct. 5, 2023

(65) Prior Publication Data

US 2025/0189979 A1 Jun. 12, 2025

(30) Foreign Application Priority Data

Mar. 29, 2022 (JP) ................................ 2022-053271

(51) Int. Cl.
*G05D 1/622* (2024.01)
*B64U 101/30* (2023.01)
(Continued)

(52) U.S. Cl.
CPC ............... *G05D 1/622* (2024.01); *G06T 7/20* (2013.01); *H04N 23/661* (2023.01);
(Continued)

(58) Field of Classification Search
CPC ............. G05D 1/622; G05D 2109/254; G05D 2111/10; G05D 2105/89; G05D 1/243;
(Continued)

(56) References Cited

U.S. PATENT DOCUMENTS 10,497,129 B1 * 12/2019 Cui ........................ H04N 23/81
11,812,197 B2 * 11/2023 Motoyama ............. H04N 7/183
(Continued)

FOREIGN PATENT DOCUMENTS

JP 2002-283913 A 10/2002
JP 2011-078008 A 4/2011
(Continued)

OTHER PUBLICATIONS

International Search Report and Written Opinion mailed on Apr. 11, 2023, received for PCT Application PCT/JP2023/009499, filed on Mar. 13, 2023, 9 pages including English Translation.

*Primary Examiner* — Michael C Zarroli
(74) *Attorney, Agent, or Firm* — XSENSUS LLP

(57) ABSTRACT

The present disclosure relates to a data processing method, a data processing device, a program, and a moving body control system that can easily realize intended movement. The data processing device generates control data corresponding to a moving route of a first moving body for controlling movement of a second moving body on the basis of a first moving image captured from the first moving body. The technology according to the present disclosure can be applied to, for example, a moving body control system that controls a moving body such as a UAV.

15 Claims, 29 Drawing Sheets

(51) Int. Cl.
*G05D 109/25* (2024.01)
*G06T 7/20* (2017.01)
*H04N 23/661* (2023.01)
*G05D 111/10* (2024.01)

(52) U.S. Cl.
CPC ... *B64U 2101/30* (2023.01); *G05D 2109/254* (2024.01); *G05D 2111/10* (2024.01); *G06T 2207/10032* (2013.01); *G06T 2207/20081* (2013.01)

(58) Field of Classification Search
CPC . G05D 1/689; G06T 7/20; G06T 2207/10032; G06T 2207/20081; H04N 23/661; H04N 7/18; H04N 23/60; H04N 23/66; H04N 23/695
See application file for complete search history.

(56) References Cited

U.S. PATENT DOCUMENTS

| | | | | |
|---|---|---|---|---|
| 12,019,458 | B2 * | 6/2024 | Zhou | G05D 1/0094 |
| 2019/0303982 | A1 * | 10/2019 | Michel | G05D 1/042 |
| 2023/0169769 | A1 * | 6/2023 | Mori | G06V 20/54 382/103 |

FOREIGN PATENT DOCUMENTS

| | | | |
|---|---|---|---|
| JP | 2020-098567 | A | 6/2020 |
| JP | 2021-012721 | A | 2/2021 |
| JP | 2021-168022 | A | 10/2021 |

* cited by examiner

DATA PROCESSING METHOD, DATA PROCESSING DEVICE, PROGRAM, AND MOVING BODY CONTROL SYSTEM

CROSS-REFERENCE TO RELATED APPLICATIONS

This application is a national stage application, pursuant to 35 U.S.C. § 371, of International Patent Application No. PCT/JP2023/009499, filed Mar. 13, 2023, which claims priority from Japanese Patent Application No. 2022-053271, filed Mar. 29, 2022, the entire contents of each are incorporated herein by reference.

TECHNICAL FIELD

The present disclosure relates to a data processing method, a data processing device, a program, and a moving body control system, and more particularly, to a data processing method, a data processing device, a program, and a moving body control system capable of easily realizing intended movement.

BACKGROUND ART

Patent Document 1 discloses a content sharing device that obtains a subject size by obtaining a subject position of a subject appearing in content on the basis of an imaging position, an imaging direction, and a subject distance of an imaging device and obtaining an imaging range size on the basis of an imaging surface size, a focal length, and the subject distance of the imaging device.

According to the content sharing device disclosed in Patent Document 1, a subject can be reliably identified for shared content, and composition and camerawork can be easily managed.

CITATION LIST

Patent Document

Patent Document 1: Japanese Patent Application Laid-Open No. 2011-78008

SUMMARY OF THE INVENTION

Problems to be Solved by the Invention

In recent years, it is becoming possible to capture a dynamic moving image by using a moving body capable of moving in a wide range at a high speed and with a high degree of freedom. However, it is difficult to operate and control the moving body as intended, and it is not easy to capture a desired moving image.

The present disclosure has been made in view of such a situation, and an object thereof is to easily realize intended movement.

Solutions to Problems

A data processing method of the present disclosure is a data processing method in which a data processing device is configured to generate control data corresponding to a moving route of a first moving body for controlling movement of a second moving body on the basis of a first moving image captured from the first moving body.

A data processing device of the present disclosure is a data processing device including a data generation unit that generates control data corresponding to a moving route of a first moving body for controlling movement of a second moving body on the basis of a moving image captured from the first moving body.

A program of the present disclosure is a program for causing a computer to execute processing of generating control data corresponding to a moving route of a first moving body for controlling movement of a second moving body on the basis of a moving image captured from the first moving body.

A moving body control system of the present disclosure is a moving body control system including: a data processing device that generates control data corresponding to a moving route of a first moving body for controlling movement of a second moving body on the basis of a moving image captured from the first moving body; and the second moving body that moves on the basis of the control data.

In the present disclosure, control data corresponding to a moving route of a first moving body for controlling movement of a second moving body is generated on the basis of a moving image captured from the first moving body.

MODE FOR CARRYING OUT THE INVENTION

Hereinafter, modes for carrying out the present disclosure (hereinafter referred to as embodiments) will be described. Note that the description will be made in the following order.

1. Background
2. Outline of Technology According to Present Disclosure
3. Hardware Configuration of Moving Body Control System
4. First Embodiment (Generation of Flight Data in Response to Editing Operation of Estimated Flight Data)
5. Second Embodiment (Generation of Flight Data Using Estimated Flight Data (1))
6. Third Embodiment (Generation of Flight Data Using Estimated Flight Data (2))
7. Fourth Embodiment (Generation of Flight Data Using Moving Image Directly (1))
8. Fifth Embodiment (Generation of Flight Data Using Moving Image Directly (2))
9. Sixth Embodiment (Generation of Flight Data Not Using Moving Image)
10. Seventh Embodiment (Flight Control Using Moving Image Directly (1))
11. Eighth Embodiment (Flight Control Using Moving Image Directly (2))
12. Cases Where Technology According to Present Disclosure Can Be Applied
13. Example of Imaging Intention (Imaging Feature Parameter)
14. Configuration Example of Computer

1. BACKGROUND

In recent years, it is becoming possible to capture a dynamic moving image by using a moving body capable of moving in a wide range at a high speed and with a high degree of freedom. However, it is difficult to operate the moving body so as to smoothly move along the intended moving route, and furthermore, it is not easy to ensure safety while performing imaging. Naturally, the user who captures the moving image does not necessarily have an advanced moving body operation techniques.

For example, a drone or the like on which imaging equipment is mounted is mainly operated manually or controlled according to a programmed template. The difficulty of safely capturing images while manually operating as intended is as described above. Meanwhile, according to the control according to the template, the image can be captured with high reproducibility in a limited pattern, but the moving image tends to be an ordinary moving image.

Therefore, in the technology according to the present disclosure, movement as intended by a moving image creator (user) is easily realized on the basis of a moving image captured by another person, so that a desired moving image can be captured more easily.

<2. Outline of Technology According to Present Disclosure>

Figure 1:
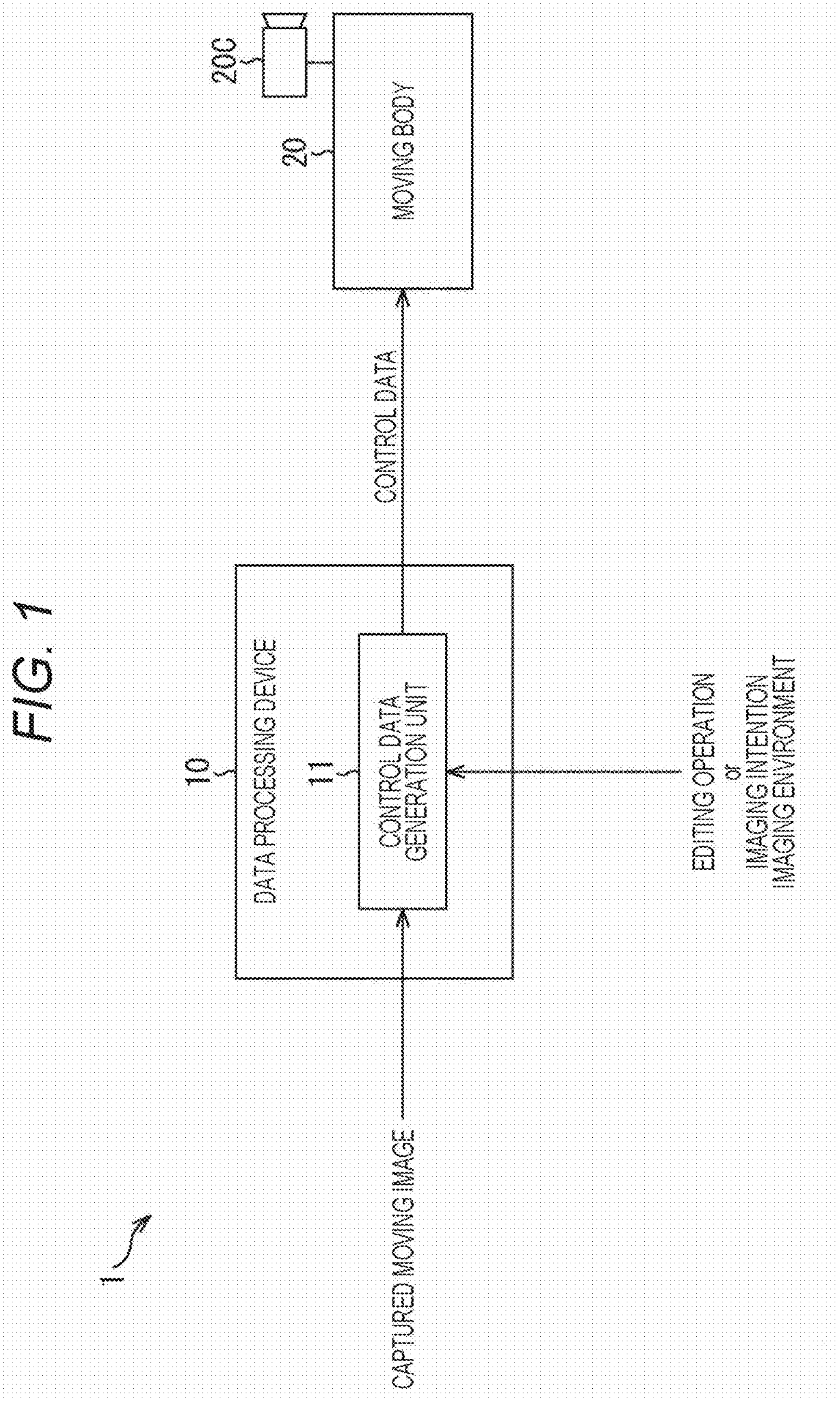
FIG. 1 is a diagram illustrating an outline of a moving body control system of a technology according to the present disclosure.

FIG. 1 is a diagram illustrating an outline of a moving body control system of the technology according to the present disclosure.

A moving body control system 1 illustrated in FIG. 1 includes a data processing device 10 and a moving body 20.

The data processing device 10 includes, for example, a cloud server provided on a cloud or a general-purpose computer such as a personal computer (PC).

The data processing device 10 includes a control data generation unit 11. The control data generation unit 11 acquires a captured moving image captured from another moving body (first moving body), and generates control data for controlling the moving body of the moving body 20 (second moving body). The control data is data corresponding to a moving route of another moving body, and includes, in addition to the moving route of the moving body 20, a speed and a posture when the moving body 20 moves according to the moving route, control information for controlling imaging from the moving body 20 to be described later, and the like.

The moving body 20 includes, for example, an autonomous mobile robot such as an unmanned aerial vehicle (UAV) (so-called drone) that autonomously flies, an autonomous traveling vehicle that moves on land, an autonomous navigation vessel that moves on water or under water, and an autonomous mobile vacuum cleaner that moves indoors.

The moving body 20 can move on the basis of the control data generated by the data processing device 10 (control data generation unit 11). Furthermore, a camera 20C is mounted on the moving body 20, and a user who is a moving image creator can capture a desired moving image by the camera 20C.

Figure 2:
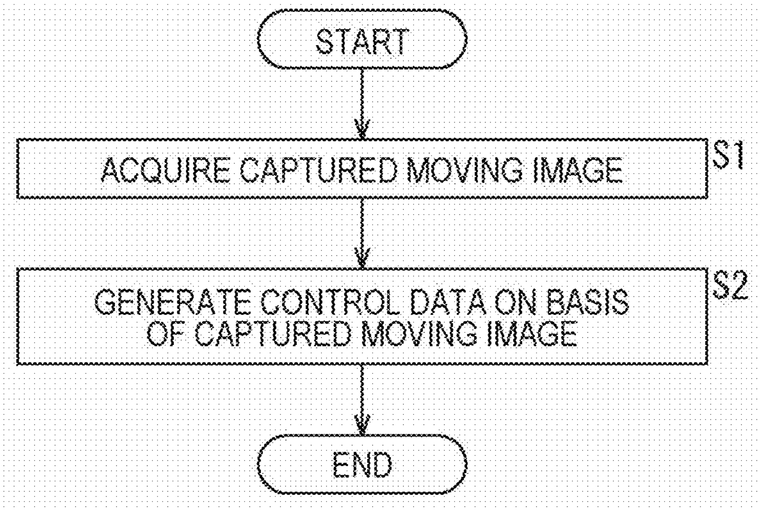
FIG. 2 is a flowchart for explaining an outline of an operation of a moving body control system.

FIG. 2 is a flowchart for explaining an outline of the operation of the moving body control system 1.

In step S1, the control data generation unit 11 acquires a captured moving image (first moving image) captured from another moving body.

In step S2, the control data generation unit 11 generates control data on the basis of the captured moving image. Specifically, the control data generation unit 11 generates control data in response to a user's direct editing operation on a moving route of another moving body estimated from the captured moving image, or generates control data reflecting the user's imaging intention or imaging environment regarding the moving image (second moving image) captured by the camera 20C.

The control data generated in this manner controls the movement of the moving body 20 or controls imaging from the moving body 20 (camera 20C). Movement of the moving body 20 and imaging from the moving body 20 (camera 20C) may be controlled on the basis of control data generated in advance, or may be controlled in real time on the basis of control data sequentially generated.

<3. Hardware Configuration of Moving Body Control System>

Figure 3:
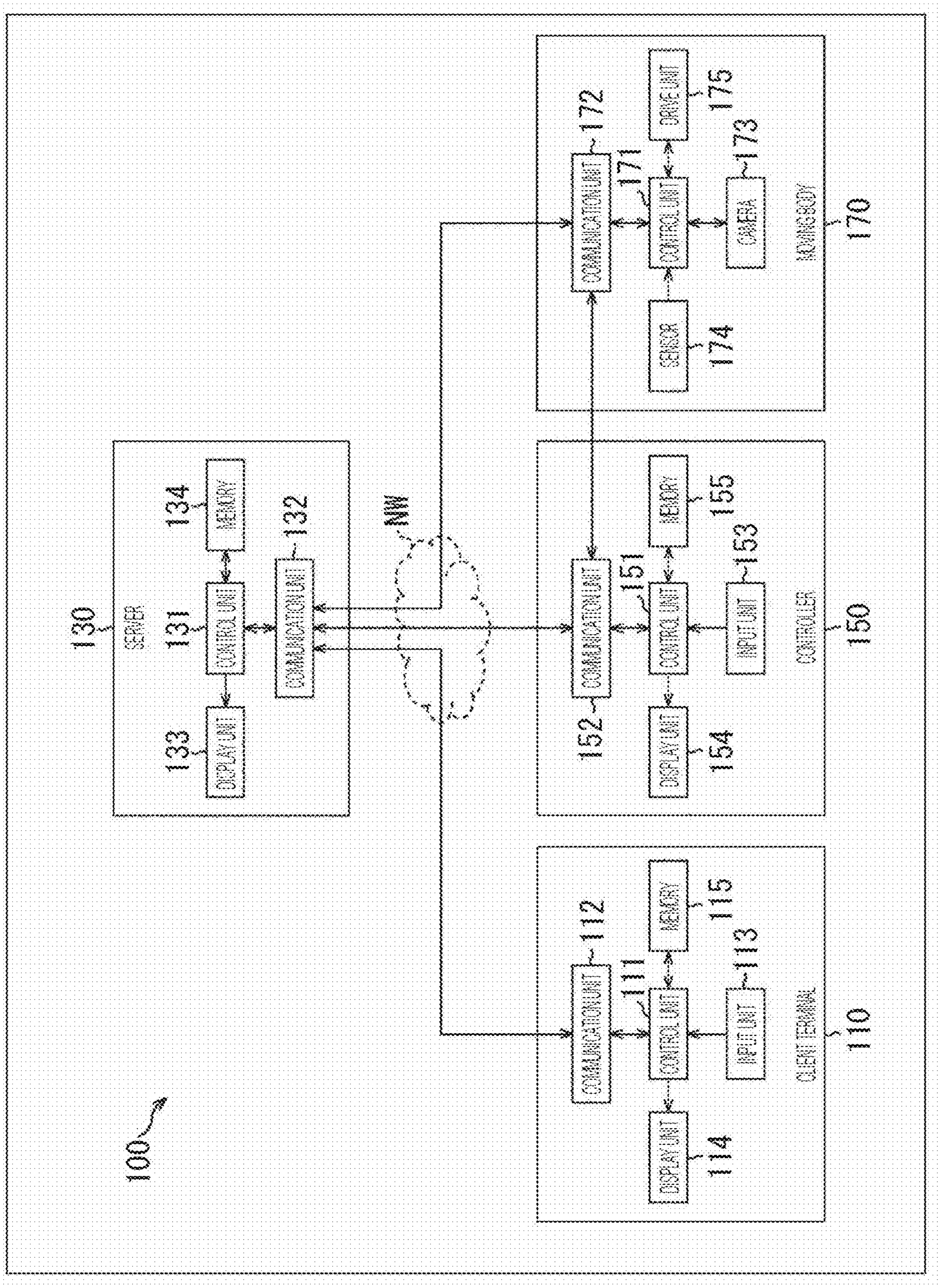
FIG. 3 is a block diagram illustrating a hardware configuration example of a moving body control system.

FIG. 3 is a block diagram illustrating a hardware configuration of a moving body control system to which the technology according to the present disclosure can be applied.

A moving body control system 100 illustrated in FIG. 3 includes a client terminal 110, a server 130, a controller 150, and a moving body 170.

In the moving body control system 100, the server 130 is communicably connected to each of the client terminal 110, the controller 150, and the moving body 170 via a wired or wireless communication path. In addition, the client terminal 110, the server 130, the controller 150, and the moving body 170 constituting the moving body control system 100 may be communicably connected to each other via a network NW such as the Internet.

(Client Terminal)

The client terminal 110 includes a PC or a tablet terminal operated by a user who operates and controls the moving body 170. The client terminal 110 includes a control unit 111, a communication unit 112, an input unit 113, a display unit 114, and a memory 115.

The control unit 111 includes a processor such as a central processing unit (CPU), and controls each unit of the client terminal 110 by executing a predetermined program according to an input signal from the input unit 113 or the like.

The communication unit 112 includes a network interface or the like, and performs wireless or wired communication with the server 130.

The input unit 113 includes a keyboard, a mouse, a microphone, a touch panel, and the like, and supplies an input signal corresponding to a user's operation to the control unit 111.

The display unit 114 includes a liquid crystal display, an organic electro-luminescence (EL) display, or the like, and displays various types of information under the control of the control unit 111.

The memory 115 includes a non-volatile memory such as a flash memory, and stores various types of information under the control of the control unit 111.

In the client terminal 110 configured in this manner, search for a captured moving image, input of an imaging intention and an imaging environment, confirmation and correction of a moving route reproduced by control data generated by the server 130, and the like are executed according to a user's operation. Furthermore, in the client terminal 110, various processing results such as control data generated by the server 130 and a simulation result of movement based on the control data are presented to the user.

(Server)

The server 130 includes a cloud server provided on a cloud or a general-purpose computer such as a PC. The server 130 includes a control unit 131, a communication unit 132, a display unit 133, and a memory 134.

The control unit 131 includes a processor such as a CPU, and controls each unit of the server 130 by executing a predetermined program.

The communication unit 132 includes a network interface or the like, and performs wireless or wired communication with the client terminal 110, the controller 150, and the moving body 170.

The display unit 133 includes a liquid crystal display, an organic EL display, or the like, and displays various types of information under the control of the control unit 131.

The memory 134 includes a non-volatile memory such as a flash memory, and stores various types of information under the control of the control unit 131.

In the server 130 configured in this manner, generation of control data based on the captured moving image, construction of a neural network used for generation of control data, simulation of movement based on the control data, and the like are executed. These execution results are transmitted to the client terminal 110. The generated control data is transmitted to the moving body 170 via the controller 150 or directly. The constructed neural network may be transmitted to and installed in the moving body 170.

(Controller)

The controller 150 includes a radio control device or a smartphone operated by a user who operates and controls the moving body 170. The controller 150 includes a control unit 151, a communication unit 152, an input unit 153, a display unit 154, and a memory 155.

The control unit 151 includes a processor such as a CPU, and controls each unit of the controller 150 by executing a predetermined program according to an input signal from the input unit 153 or the like.

The communication unit 152 includes a network interface or the like, and performs wireless or wired communication with the server 130. Furthermore, the communication unit 152 can also perform wireless direct communication with the moving body 170.

The input unit 153 includes a touch panel or the like in addition to a stick, a switch, and a button, and supplies an input signal corresponding to a user's operation to the control unit 151.

The display unit 154 includes a liquid crystal display, an organic EL display, or the like in addition to various lamps, and displays various types of information under the control of the control unit 151.

The memory 155 includes a non-volatile memory such as a flash memory, and stores various types of information under the control of the control unit 151.

In the controller 150 configured in this manner, an operation signal corresponding to a user's operation is transmitted to the moving body 170. Furthermore, in the controller 150, the aircraft state of the moving body 170 is presented to the user as necessary.

(Moving Body)

The moving body 170 includes a UAV (drone), an autonomous mobile robot such as an autonomous traveling vehicle, an autonomous navigation vessel, and an autonomous mobile vacuum cleaner. The moving body 170 includes a control unit 171, a communication unit 172, a camera 173, a sensor 174, and a drive unit 175.

The control unit 171 includes a CPU, a memory, and the like, and controls the communication unit 172, the camera 173, and the drive unit 175 by executing a predetermined program.

The communication unit 172 includes a network interface or the like, and performs wireless or wired communication with the controller 150 and the server 130 for operating the moving body 170.

The camera 173 captures a moving image under the control of the control unit 171. Furthermore, the camera 173 can also be configured to capture a moving image on the basis of control of an imaging processing unit (processor or the like) provided therein, for example, without depending on the control of the control unit 171.

The sensor 174 includes various sensors, and senses each direction around the moving body 170 including the traveling direction of the moving body 170. By sensing the surroundings of the moving body 170, autonomous movement of the moving body 170 is realized.

The drive unit 175 is a mechanism for moving the moving body 170, and includes a flight mechanism, a traveling mechanism, a propulsion mechanism, and the like. In this example, the moving body 170 is configured as a UAV, and the drive unit 175 is configured by a motor, a propeller, or the like as a flight mechanism. Furthermore, in a case where the moving body 170 is configured as an autonomous traveling vehicle, the drive unit 175 is configured by wheels or the like as a traveling mechanism, and in a case where the moving body 170 is configured as an autonomous navigation vessel, the drive unit 175 is configured by a screw propeller or the like as a propulsion mechanism. The drive unit 175 is driven according to the control of the control unit 171 to move the moving body 170.

In the moving body 170 configured in this manner, control of movement of the moving body 170 and control of imaging from the moving body 170 are executed on the basis of the control data generated by the server 130.

Hereinafter, an embodiment realized by the moving body control system 100 described with reference to FIG. 3 will be described. In the following embodiment, it is assumed that both the moving body on which the captured moving image is captured and the moving body on which the moving image desired by the user is captured are UAVs (drones).

4. First Embodiment (Generation of Flight Data in Response to Editing Operation of Estimated Flight Data)

Figure 4:
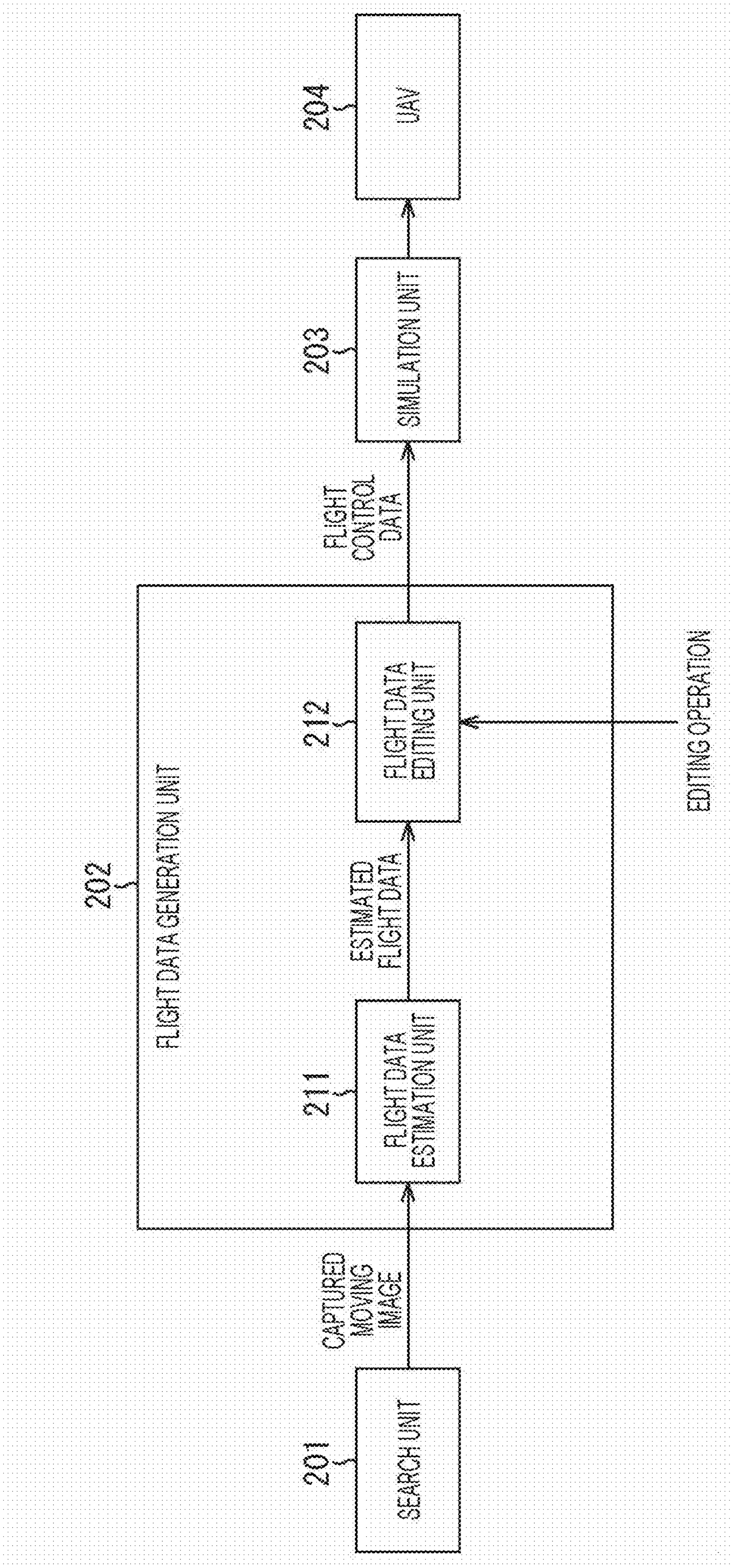
FIG. 4 is a block diagram illustrating a configuration example of a moving body control system according to the first embodiment.

FIG. 4 is a block diagram illustrating a configuration example of a moving body control system according to a first embodiment of the present disclosure.

The moving body control system in FIG. 4 includes a search unit 201, a flight data generation unit 202, a simulation unit 203, and a UAV 204. Each configuration illustrated in FIG. 4 can be realized by the moving body control system 100 described with reference to FIG. 3.

The search unit 201 can be realized by the client terminal 110 in FIG. 3.

The search unit 201 searches the captured moving image captured from another UAV according to the user's operation, and supplies the searched captured moving image to the flight data generation unit 202.

Specifically, the search unit 201 searches for the captured moving image on the basis of imaging feature parameters representing imaging features of the moving image, such as a composition and an angle of view of the moving image, camerawork, a positional relationship with a subject to be gazed, a moving route and a moving speed at the time of imaging, and a structure of an environment in which the moving image is captured, which are input by the user, and other free words. Furthermore, the search unit 201 may search and select a captured moving image from, for example, sample moving images that can be previewed.

The user can find a captured moving image to be referred to in capturing a desired moving image by operating the search unit 201. Note that the search engine that actually searches for the captured moving image may be incorporated in the client terminal 110 or may be arranged on the Web.

The flight data generation unit 202 and the simulation unit 203 can be realized by the server 130 in FIG. 3.

The flight data generation unit 202 generates flight control data corresponding to a moving route (flight route) of the UAV on which the captured moving image is captured, for controlling the flight of the UAV 204, on the basis of the captured moving image from the search unit 201, and outputs the flight control data to the simulation unit 203.

The flight data generation unit 202 of FIG. 4 includes a flight data estimation unit 211 and a flight data editing unit 212.

The flight data estimation unit 211 estimates flight data including a flight route of the UAV on which the captured moving image is captured on the basis of the captured moving image from the search unit 201. For example, the flight data estimation unit 211 estimates the flight data by calculating a map of the surrounding environment where the UAV in which the captured moving image is captured flies and a moving route of the UAV in the map by visual simultaneous localization and mapping (SLAM) by the monocular camera.

In a case where the camera parameters of the camera mounted on the UAV are unknown, the influence of distortion remains or the scale becomes indefinite. In addition, in a case where the moving route extends over a long distance, the accuracy of the SLAM decreases. However, in order to generate the flight data in the subsequent stage, it is important to obtain an element used for editing in the subsequent stage, and the influence of distortion and geometric accuracy of SLAM on the final imaging result is minor. Further, the indefinite scale can be resolved by manually adjusting the scale, for example.

The flight data editing unit 212 generates flight data by editing estimated flight data. Specifically, the flight data editing unit 212 generates the flight control data in response to the user's direct editing operation of the estimated flight data.

Here, the flight control data is generated by, for example, directly geometrically editing the flight route corresponding to the estimated flight data displayed on the client terminal 110 by the user's operation. Specifically, control data adapted to the flight scene of the UAV 204 is generated by editing a straight line or a curved line representing the flight route or changing a subject to be gazed.

The simulation unit 203 executes a flight simulation of the UAV 204 on the basis of the flight control data generated by the flight data generation unit 202. The simulation result of the flight is displayed on the client terminal 110. The simulation unit 203 corrects the flight control data according to the user's direct editing operation on the simulation result displayed on the client terminal 110.

In this manner, the flight control data obtained by the user repeating confirmation and correction of the simulation result is output to the UAV 204.

The UAV 204 corresponds to the moving body 170 in FIG. 3. The flight and imaging of the UAV 204 are controlled on the basis of the flight control data generated by the flight data generation unit 202 and corrected by the simulation unit 203.

Figure 5:
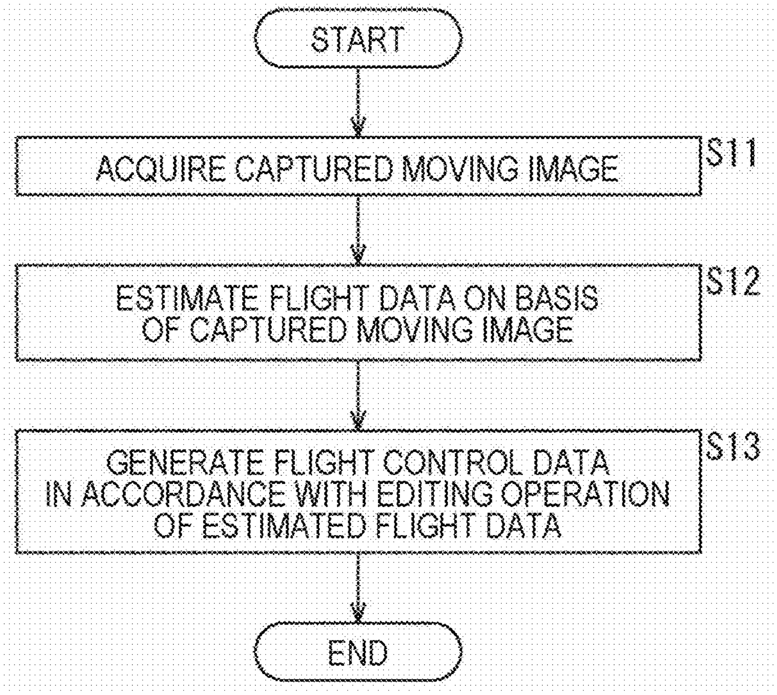
FIG. 5 is a flowchart for explaining a flow of flight data generation processing.

Next, a flow of flight data generation processing by the flight data generation unit 202 in FIG. 4 will be described with reference to a flowchart in FIG. 5.

In step S11, the flight data generation unit 202 acquires the captured moving image searched by the search unit 201.

In step S12, the flight data estimation unit 211 estimates flight data including the flight route of the UAV on which the captured moving image is captured on the basis of the captured moving image from the search unit 201.

In step S13, the flight data editing unit 212 generates the flight control data in accordance with the user's direct editing operation of the estimated flight data.

The flight control data generated in advance in this manner controls the flight of the UAV 204 or controls imaging from the camera mounted on the UAV 204.

According to the above processing, the flight data of the UAV in which the captured moving image is captured is estimated, and the flight control data is generated according to the editing operation of the estimated flight data. As a result, it is possible to easily realize the intended flight similar to the UAV in which the captured moving image is captured by the simple editing operation without requiring the advanced manual operation techniques, and eventually, it is possible to more easily capture a moving image desired by the user.

5. Second Embodiment (Generation of Flight Data Using Estimated Flight Data (1))

Figure 6:
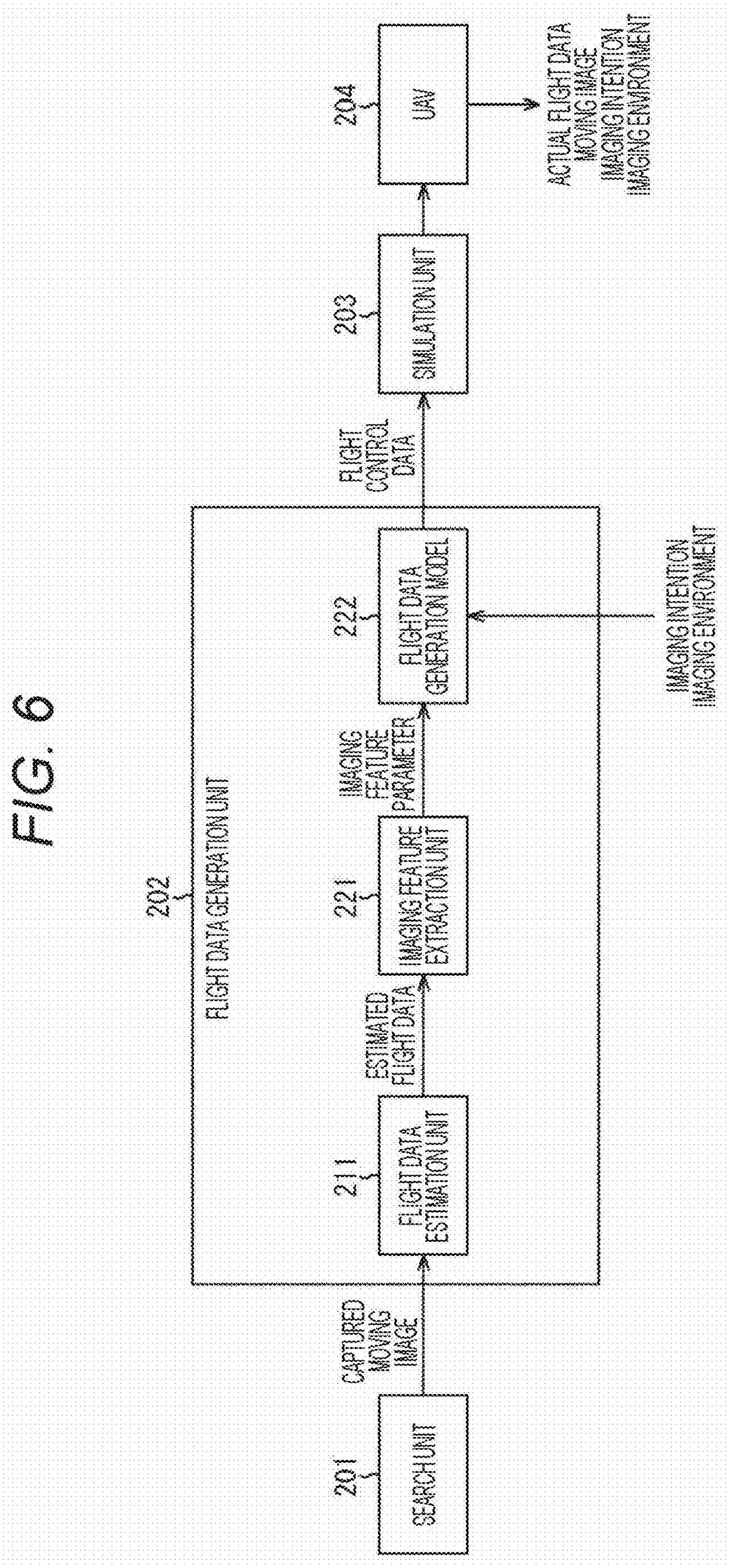
FIG. 6 is a block diagram illustrating a configuration example of a moving body control system according to a second embodiment.

FIG. 6 is a block diagram illustrating a configuration example of a moving body control system according to a second embodiment of the present disclosure.

In the moving body control system of FIG. 6, the flight data generation unit 202 includes an imaging feature extraction unit 221 and a flight data generation model 222 in addition to the flight data estimation unit 211 of FIG. 4.

The imaging feature extraction unit 221 extracts imaging feature parameters of the captured image from the flight data (estimated flight data) estimated by the flight data estimation unit 211, and supplies the imaging feature parameters to the flight data generation model 222. The imaging feature parameter is a human-resolvable parameter representing an imaging feature of a moving image.

The imaging feature extraction unit 221 includes, for example, a machine learning model obtained by performing learning with actual flight data obtained by the UAV actually flying as an input and an imaging feature parameter of a moving image captured by the flight as an output.

The flight data generation model 222 generates flight control data by applying the imaging feature parameters extracted by the imaging feature extraction unit 221 to the imaging intention and the imaging environment input by the user.

The imaging intention input by the user corresponds to an imaging feature represented by an imaging feature parameter, and includes, for example, a composition and an angle of view of a moving image desired by the user, camerawork, a positional relationship with a subject to be gazed, a moving route at the time of imaging, and the like.

The imaging environment input by the user also corresponds to the imaging feature represented by the imaging feature parameter, and includes a structure of an environment (in which the UAV 204 flies) in which the moving image desired by the user is captured, that is, a geometric shape of the imaging target or the capturable target around the UAV 204. For example, the imaging environment includes a roof, a wall, a column, and the like in a building, includes a ground, a cliff, trees, and the like in the outdoors, and includes a large structure such as a building or a bridge in an urban area in particular. Furthermore, the imaging environment may include other moving bodies including a person, a vehicle, and a flying object, or may include an object as an imaging target or an object to be excluded from the imaging target. Furthermore, the imaging environment may include a person or an object that needs to be separated by a predetermined distance or more to generate a flight route during flight of the UAV 204, a person or an object that needs to be avoided during flight, or may include a positional relationship between a light source including the sun or illumination and a subject. Furthermore, the imaging environment may include latitude, longitude, map information including topography, season, time zone, weather, temperature, and the like.

Here, in the client terminal 110, for example, the imaging feature is adjusted using a graphical user interface (GUI) by the user's operation, thereby generating the flight control data.

The flight data generation model 222 includes a using the imaging feature parameter, the imaging intention, and the imaging environment as inputs and using the actual flight data obtained by the UAV actually flying as an output under these conditions.

Figure 7:
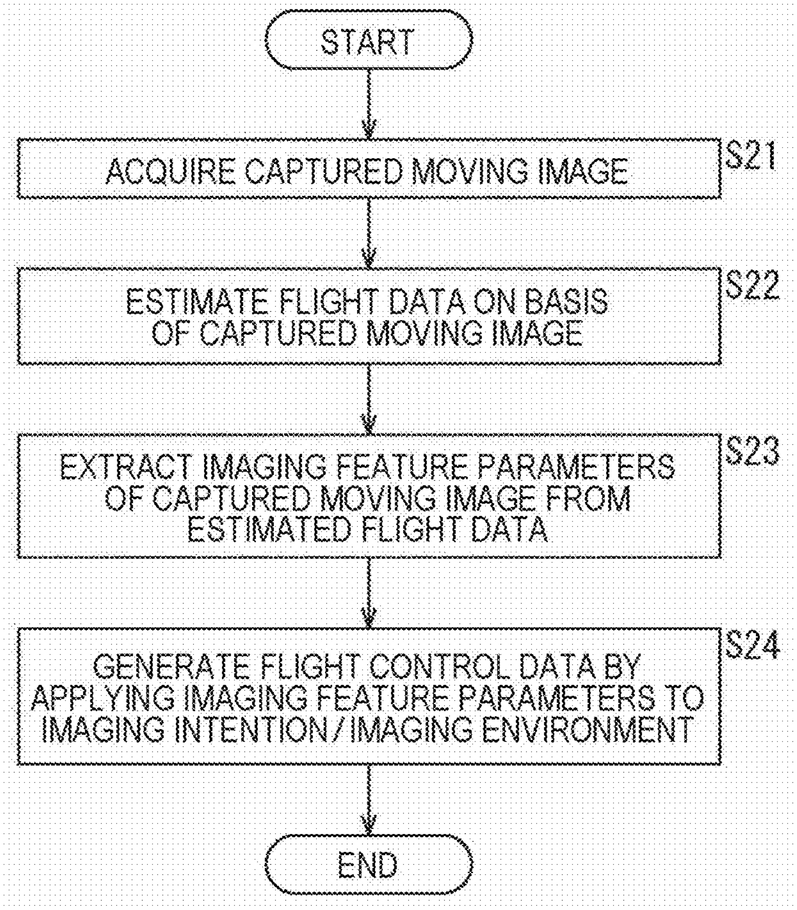
FIG. 7 is a flowchart for explaining a flow of flight data generation processing.

Next, a flow of flight data generation processing by the flight data generation unit 202 in FIG. 6 will be described with reference to a flowchart in FIG. 7.

In step S21, the flight data generation unit 202 acquires the captured moving image searched by the search unit 201.

In step S22, the flight data estimation unit 211 estimates flight data including the flight route of the UAV on which the captured moving image is captured on the basis of the captured moving image from the search unit 201.

In step S23, the imaging feature extraction unit 221 extracts the imaging feature parameters of the captured image from the estimated flight data estimated by the flight data estimation unit 211.

In step S24, the flight data generation model 222 generates flight control data by applying the imaging feature parameters extracted by the imaging feature extraction unit 221 to the imaging intention/imaging environment input by the user. At this time, the imaging feature parameters extracted by the imaging feature extraction unit 221 may be adjusted by the user and then input to the flight data generation model 222.

The flight control data generated in advance in this manner controls the flight of the UAV 204 or controls imaging from the camera mounted on the UAV 204.

Note that the flight of the UAV 204, the actual flight data and the moving image obtained by imaging from the UAV 204, and the imaging intention and the imaging environment input by the user can be used for learning of the imaging feature extraction unit 221 and the flight data generation model 222.

According to the above processing, the imaging feature parameter that is resolvable to a person is extracted from the flight data estimated on the basis of the captured moving image, and the imaging feature parameter is applied to the imaging intention or the imaging environment of the user, whereby the flight control data is generated. As a result, it is possible to easily realize the intended flight only by adjusting the flight and imaging features that can be interpreted by the user, and eventually, it is possible to more easily capture a moving image desired by the user.

6. Third Embodiment (Generation of Flight Data Using Estimated Flight Data (2))

Figure 8:
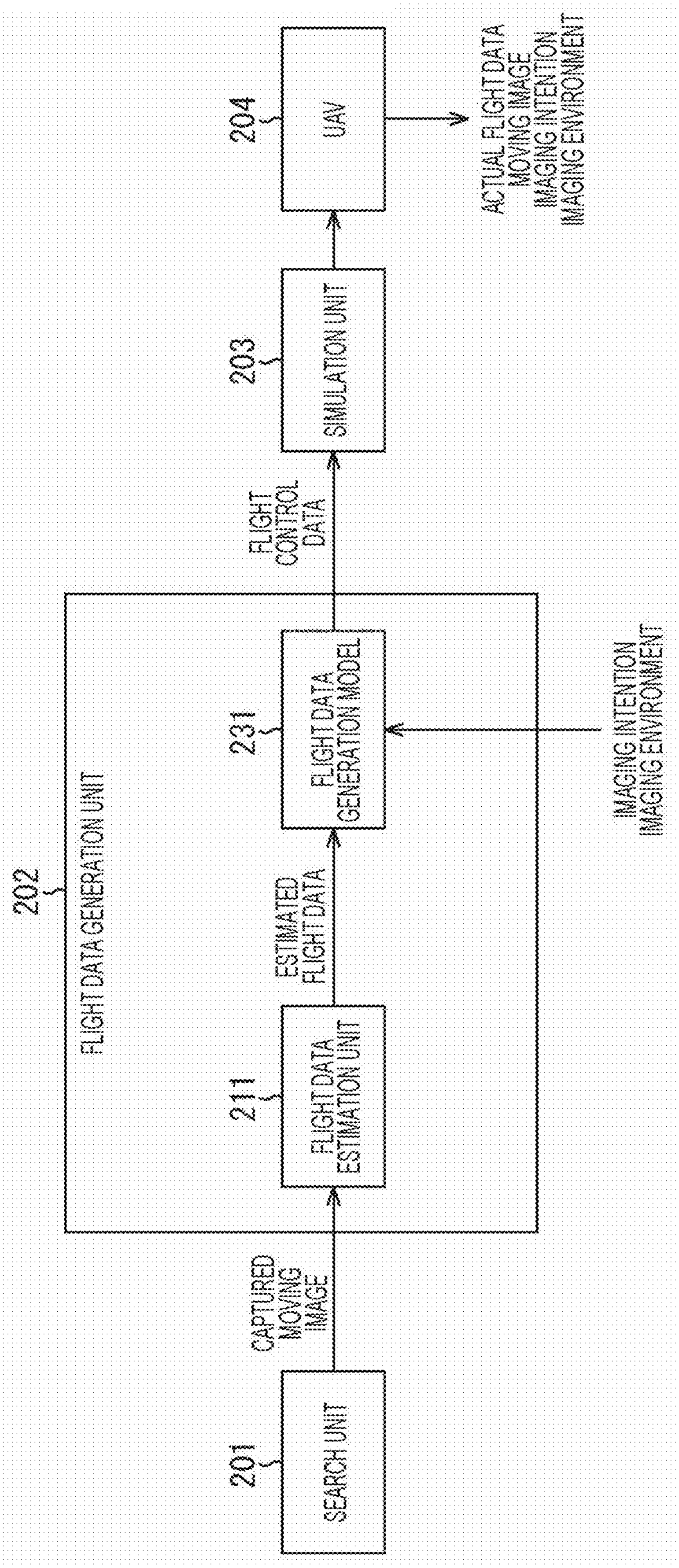
FIG. 8 is a block diagram illustrating a configuration example of a moving body control system according to a third embodiment.

FIG. 8 is a block diagram illustrating a configuration example of a moving body control system according to a third embodiment of the present disclosure.

In the moving body control system of FIG. 8, the flight data generation unit 202 includes a flight data generation model 231 in addition to the flight data estimation unit 211 of FIG. 4.

The flight data generation model 231 generates flight control data by adapting the flight data (estimated flight data) estimated by the flight data estimation unit 211 to the imaging intention and the imaging environment input by the user.

Here, in the client terminal 110, for example, a text indicating an imaging intention or an imaging environment is input or the imaging intention or the imaging environment is selected using the GUI by the user's operation, whereby the flight control data is generated.

The flight data generation model 231 includes a machine learning model obtained by performing learning using the estimated flight data, the imaging intention, and the imaging environment as inputs and using the actual flight data obtained by the UAV actually flying as an output under these conditions.

Figure 9:
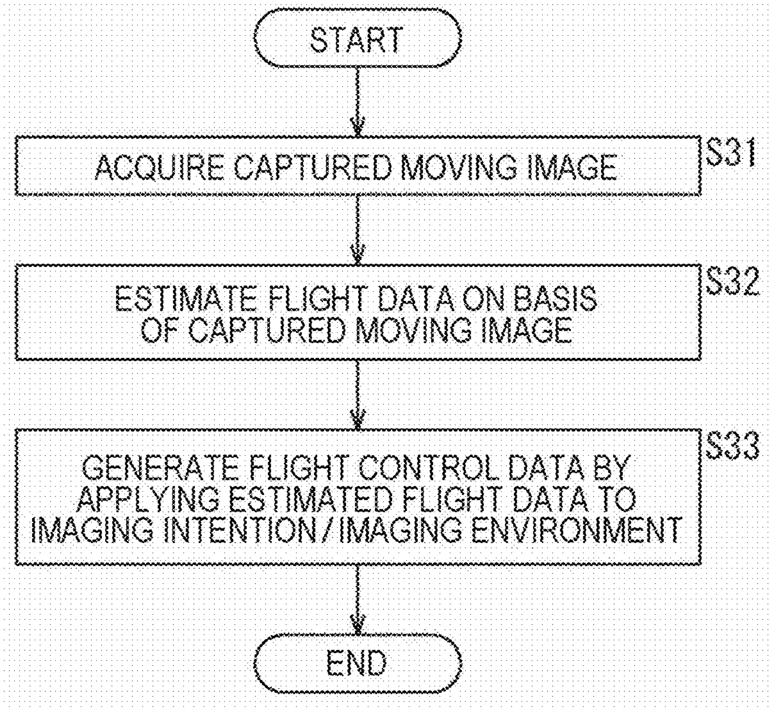
FIG. 9 is a flowchart for explaining a flow of flight data generation processing.

Next, a flow of flight data generation processing by the flight data generation unit 202 in FIG. 8 will be described with reference to a flowchart in FIG. 9.

In step S31, the flight data generation unit 202 acquires the captured moving image searched by the search unit 201.

In step S32, the flight data estimation unit 211 estimates flight data including the flight route of the UAV on which the captured moving image is captured on the basis of the captured moving image from the search unit 201.

In step S33, the flight data generation model 231 generates flight control data by adapting the estimated flight data estimated by the flight data estimation unit 211 to the imaging intention and the imaging environment input by the user.

The flight control data generated in advance in this manner controls the flight of the UAV 204 or controls imaging from the camera mounted on the UAV 204.

Note that the flight of the UAV 204, the actual flight data and the moving image obtained by imaging from the UAV 204, and the imaging intention and the imaging environment input by the user can be used for learning of the flight data generation model 231.

According to the above processing, the flight control data is generated by adapting the flight data estimated on the basis of the captured moving image to the user's imaging intention and imaging environment. As a result, it is possible to easily realize the intended flight only by the user inputting his/her own imaging intention or an imaging environment in which the UAV 204 is desired to fly, and eventually, it is possible to more easily capture a moving image desired by the user.

Note that, in the second and third embodiments described above, in a case where the captured image searched by the search unit 201 is a moving image associated with the actual flight data or the imaging intention, the estimated flight data or the imaging feature parameter based on the captured moving image is the actual flight data or the imaging intention itself. In this case, the flight data estimation and the imaging feature parameter extraction can be skipped, and the accuracy up to the generation of the flight control data can be improved.

7. Fourth Embodiment (Generation of Flight Data Using Moving Image Directly (1))

Figure 10:
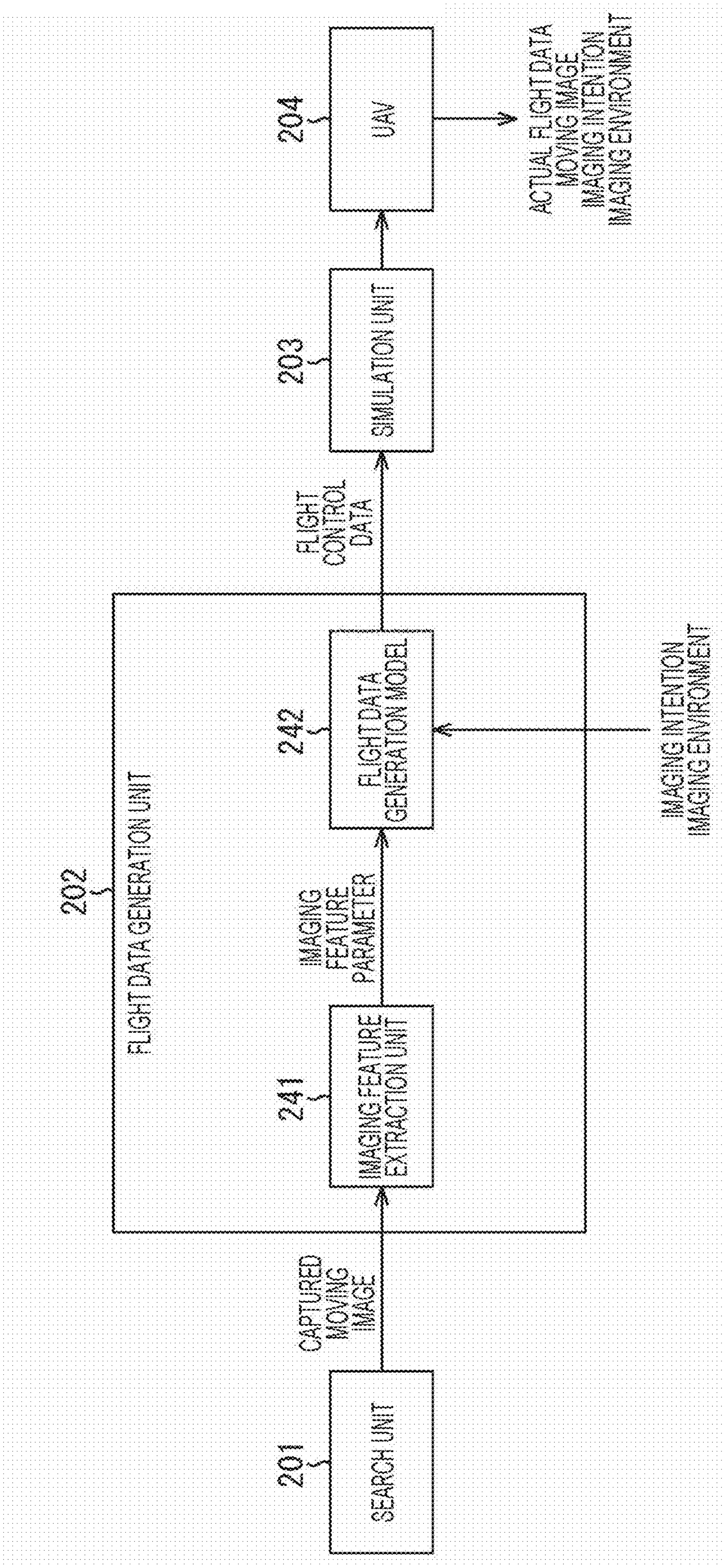
FIG. 10 is a block diagram illustrating a configuration example of a moving body control system according to a fourth embodiment.

FIG. 10 is a block diagram illustrating a configuration example of a moving body control system according to a fourth embodiment of the present disclosure.

In the moving body control system of FIG. 10, the flight data generation unit 202 includes an imaging feature extraction unit 241 and a flight data generation model 242.

The imaging feature extraction unit 241 directly extracts imaging feature parameters from the captured moving image from the search unit 201, and supplies the imaging feature parameters to the flight data generation model 242. As described above, the imaging feature parameter is a human-resolvable parameter representing the imaging feature of the moving image.

The imaging feature extraction unit 241 includes, for example, a machine learning model obtained by performing learning with a moving image captured by actual flight of the UAV as an input and an imaging feature parameter of the moving image as an output.

The flight data generation model 242 generates flight control data by applying the imaging feature parameters extracted by the imaging feature extraction unit 241 to the imaging intention and the imaging environment input by the user.

Here, in the client terminal 110, for example, the imaging feature is adjusted using the GUI by the user's operation, thereby generating the flight control data.

The flight data generation model 242 includes a machine learning model obtained by performing learning using the imaging feature parameter, the imaging intention, and the imaging environment as inputs and using the actual flight data obtained by the UAV actually flying as an output under these conditions.

Figure 11:
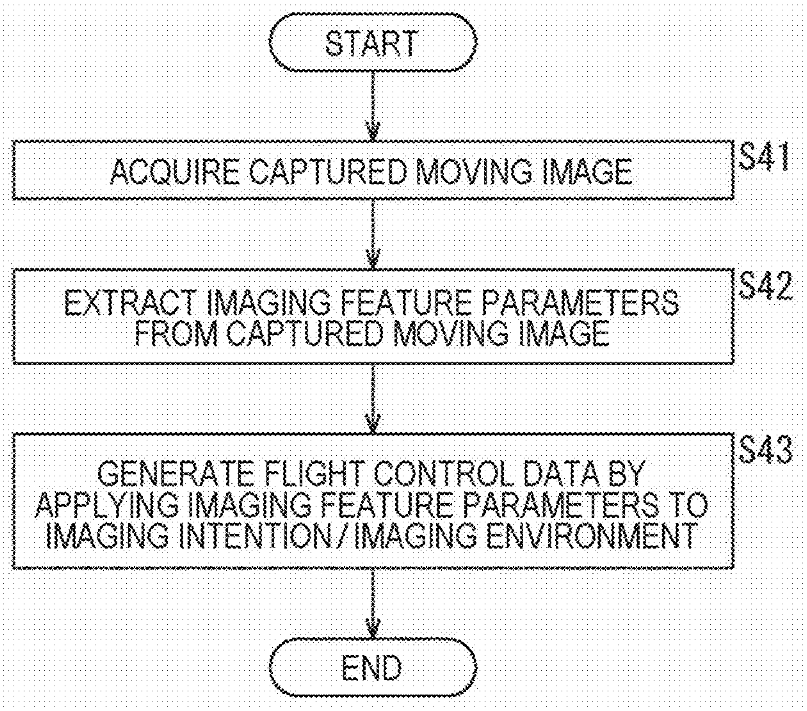
FIG. 11 is a flowchart for explaining a flow of flight data generation processing.

Next, a flow of flight data generation processing by the flight data generation unit 202 in FIG. 10 will be described with reference to a flowchart in FIG. 11.

In step S41, the flight data generation unit 202 acquires the captured moving image searched by the search unit 201.

In step S42, the imaging feature extraction unit 241 extracts the imaging feature parameters from the captured moving image from the search unit 201.

In step S43, the flight data generation model 242 generates flight control data by applying the imaging feature parameters extracted by the imaging feature extraction unit 241 to the imaging intention/imaging environment input by the user.

The flight control data generated in advance in this manner controls the flight of the UAV 204 or controls imaging from the camera mounted on the UAV 204.

Note that the flight of the UAV 204, the actual flight data and the moving image obtained by imaging from the UAV 204, and the imaging intention and the imaging environment input by the user can be used for learning of the imaging feature extraction unit 241 and the flight data generation model 242.

According to the above processing, the imaging feature parameter that is resolvable to a person is extracted from the captured moving image, and the imaging feature parameter is applied to the imaging intention and the imaging environment of the user, whereby the flight control data is generated. As a result, it is possible to easily realize the intended flight only by adjusting the flight and imaging features that can be interpreted by the user, and eventually, it is possible to more easily capture a moving image desired by the user.

8. Fifth Embodiment (Generation of Flight Data Using Moving Image Directly (2))

Figure 12:
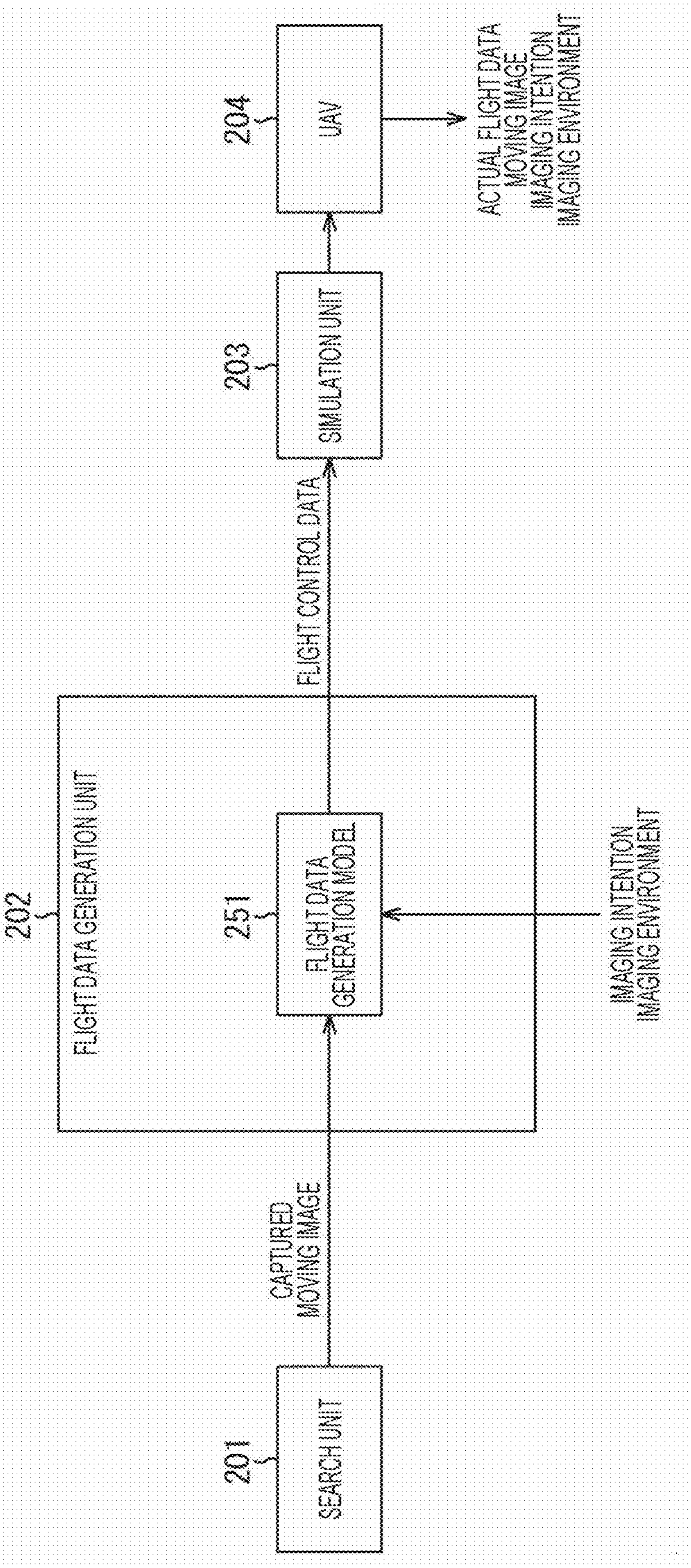
FIG. 12 is a block diagram illustrating a configuration example of a moving body control system according to a fifth embodiment.

FIG. 12 is a block diagram illustrating a configuration example of a moving body control system according to a fifth embodiment of the present disclosure.

In the moving body control system of FIG. 12, the flight data generation unit 202 includes a flight data generation model 251.

The flight data generation model 251 generates flight control data adapted to the imaging intention and the imaging environment input by the user on the basis of the captured moving image from the search unit 201.

Here, in the client terminal 110, for example, a text indicating an imaging intention or an imaging environment is input or the imaging intention or the imaging environment is selected using the GUI by the user's operation, whereby the flight control data is generated.

The flight data generation model 251 includes a using the moving image, the imaging intention, and the imaging environment as inputs and using the actual flight data obtained by the UAV actually flying as an output under these conditions.

For analysis of flight data based on a moving image, for example, a technique of estimating a trajectory of a camera position from a moving image by structure from motion (SEM) can be applied.

Figure 13:
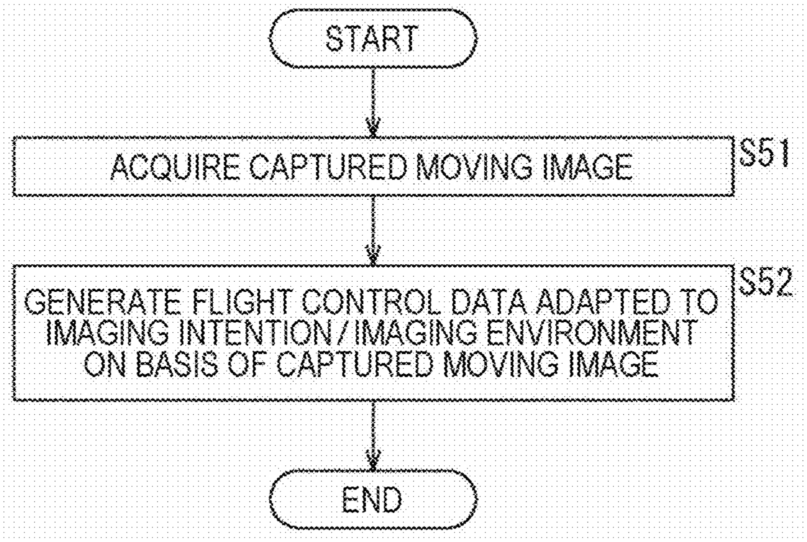
FIG. 13 is a flowchart for explaining a flow of flight data generation processing.

Next, a flow of flight data generation processing by the flight data generation unit 202 in FIG. 12 will be described with reference to a flowchart in FIG. 13.

In step S51, the flight data generation unit 202 acquires the captured moving image searched by the search unit 201.

In step S52, the flight data generation model 251 generates flight control data adapted to the imaging intention and the imaging environment input by the user on the basis of the captured moving image from the search unit 201.

The flight control data generated in advance in this manner controls the flight of the UAV 204 or controls imaging from the camera mounted on the UAV 204.

Note that the flight of the UAV 204, the actual flight data and the moving image obtained by imaging from the UAV 204, and the imaging intention and the imaging environment input by the user can be used for learning of the flight data generation model 251.

According to the above processing, the flight control data adapted to the imaging intention and the imaging environment of the user is generated on the basis of the captured moving image. As a result, it is possible to easily realize the intended flight only by the user inputting his/her own imaging intention or an imaging environment in which the UAV 204 is desired to fly, and eventually, it is possible to more easily capture a moving image desired by the user.

9. Sixth Embodiment (Generation of Flight Data Not Using Moving Image)

Figure 14:
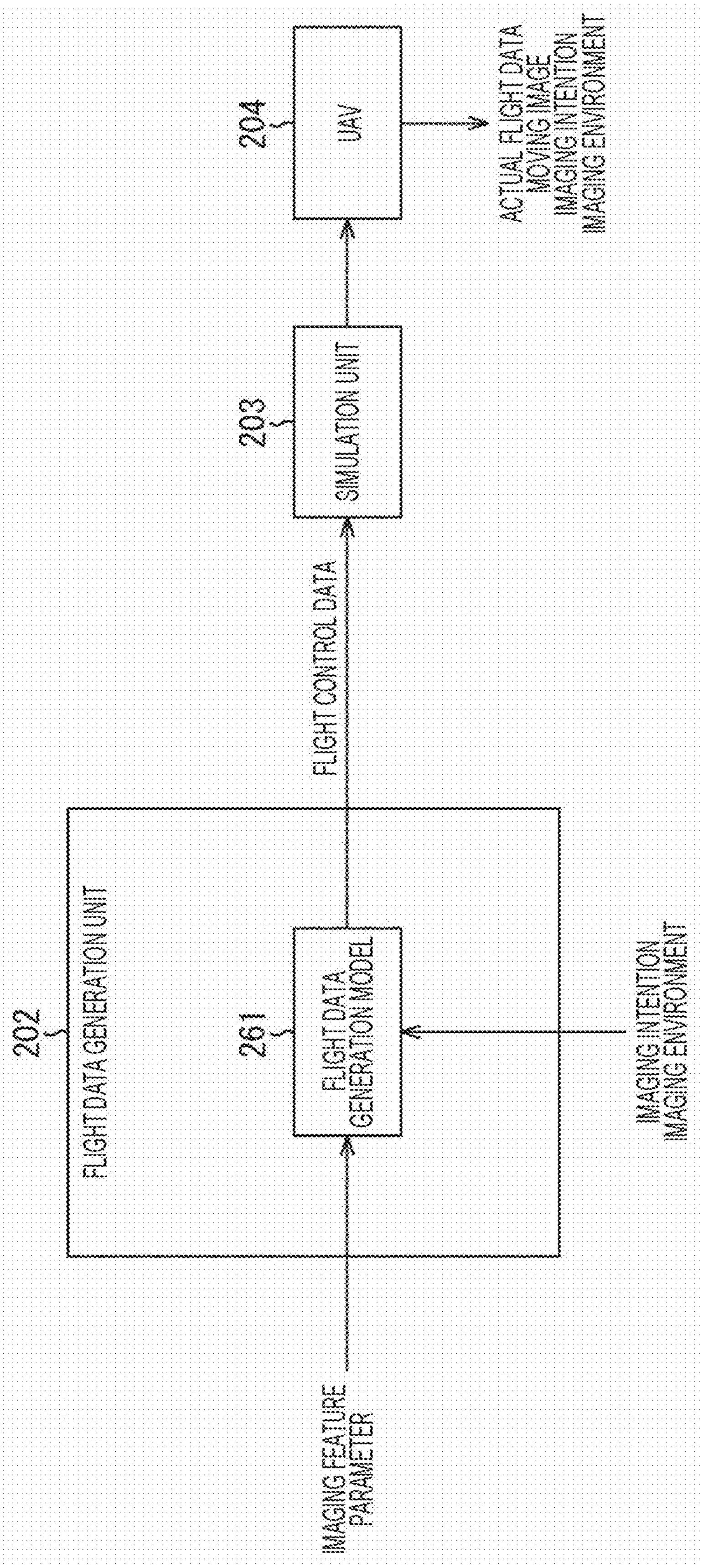
FIG. 14 is a block diagram illustrating a configuration example of a moving body control system according to a sixth embodiment.

FIG. 14 is a block diagram illustrating a configuration example of a moving body control system according to a sixth embodiment of the present disclosure.

In the moving body control system of FIG. 14, the flight data generation unit 202 includes a flight data generation model 261. Furthermore, the imaging feature parameter designated by the user in the client terminal 110, for example, is input to the flight data generation unit 202 instead of the captured moving image from the search unit 201.

The flight data generation model 261 generates flight control data by applying the imaging feature parameter designated by the user to the imaging intention or the imaging environment input by the user.

Here, in the client terminal 110, for example, a text indicating an imaging intention or an imaging environment is input or the imaging intention or the imaging environment is selected using the GUI by the user's operation, whereby the flight control data is generated.

The flight data generation model 261 includes a machine learning model obtained by performing learning using the imaging feature parameter, the imaging intention, and the imaging environment as inputs and using the actual flight data obtained by the UAV actually flying as an output under these conditions.

According to the above configuration, it is possible to generate the flight control data adapted to the user's imaging intention and imaging environment without preparing the original moving image. In particular, in this case, the user can enjoy the generation of the flight control data in a more exploratory manner, such as finding an unexpected motion of the UAV.

The above-described embodiments can be applied to a case of creating a flight plan (scenario) from the start to the end of flight by generating flight control data in advance and repeating confirmation and correction. However, with the flight plan prepared in advance, it is not possible to cope with imaging for a long time exceeding a schedule, occurrence of an unexpected situation, and the like.

Therefore, in the following, embodiments in which the imaging can be continued as long as the situation continues by sequentially executing the flight control of the UAV will be described.

10. Seventh Embodiment (Flight Control Using Moving Image Directly (1))

Figure 15:
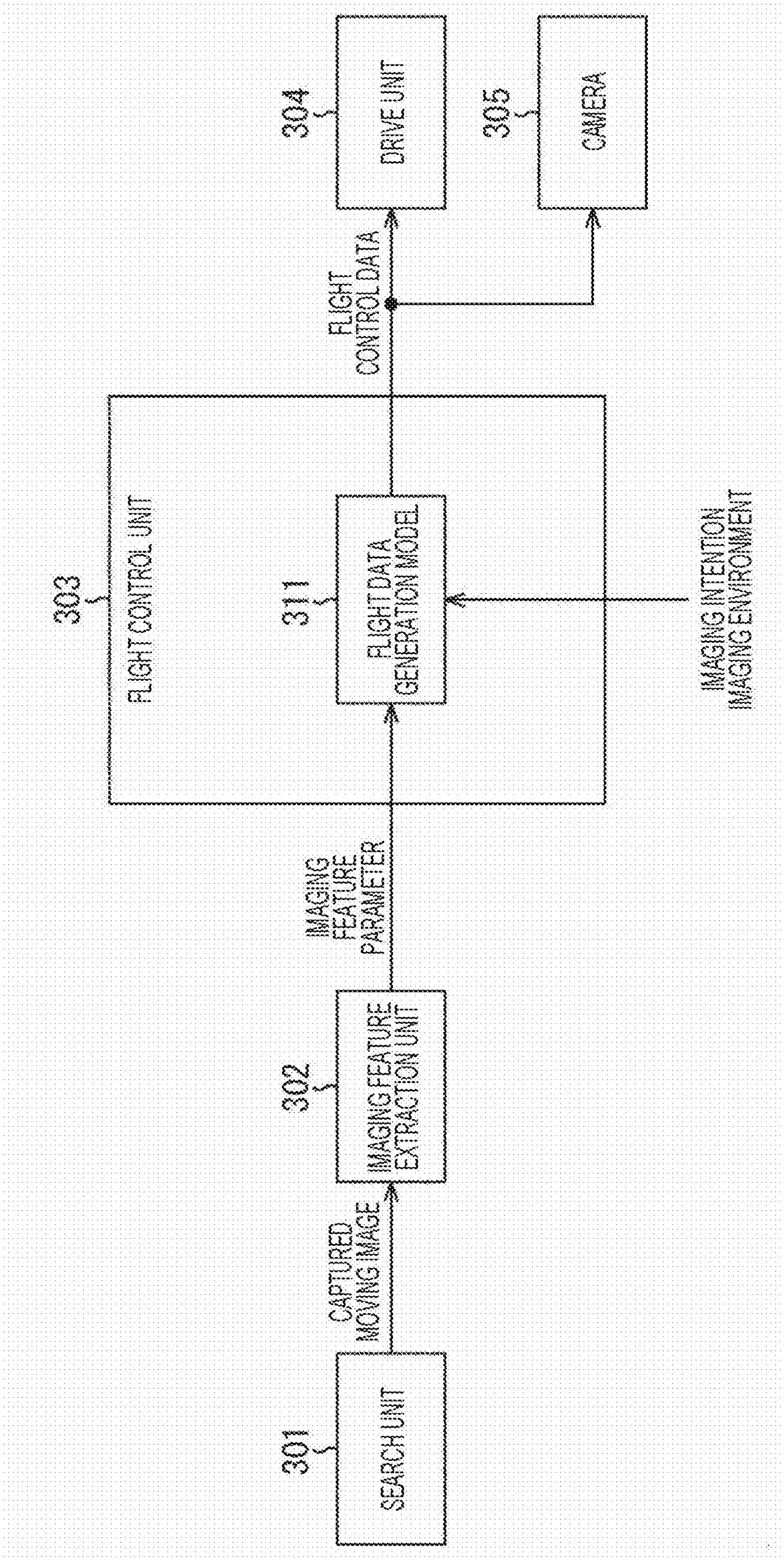
FIG. 15 is a block diagram illustrating a configuration example of a moving body control system according to a seventh embodiment.

FIG. 15 is a block diagram illustrating a configuration example of a moving body control system according to a seventh embodiment of the present disclosure.

The moving body control system in FIG. 15 includes a search unit 301, an imaging feature extraction unit 302, a flight control unit 303, a drive unit 304, and a camera 305. Each configuration illustrated in FIG. 15 can also be realized by the moving body control system 100 described with reference to FIG. 3.

The search unit 301 can be realized by the client terminal 110 in FIG. 3.

The search unit 301 searches for a captured moving image captured by another UAV according to the user's operation, and supplies the searched captured moving image to the imaging feature extraction unit 302.

The imaging feature extraction unit 302 can be realized by the server 130 in FIG. 3.

The imaging feature extraction unit 302 directly extracts imaging feature parameters from the captured moving image from the search unit 301, and supplies the imaging feature parameters to the flight control unit 303. As described above, the imaging feature parameter is a human-resolvable parameter representing the imaging feature of the moving image.

The flight control unit 303, the drive unit 304, and the camera 305 can be realized by the moving body 170 (UAV) in FIG. 3.

The flight control unit 303 controls the flight of the UAV and imaging from the UAV by controlling the drive unit 304 corresponding to the drive unit 175 in FIG. 3 and the camera 305 corresponding to the camera 173 in FIG. 3. The flight control unit 303 includes a flight data generation model 311 installed in the UAV in advance.

The flight data generation model 311 sequentially generates flight control data by applying the imaging feature parameters extracted by the imaging feature extraction unit 302 to the imaging intention and the imaging environment input by the user. At this time, the imaging feature parameters extracted by the imaging feature extraction unit 302 may be adjusted by the user and then input to the flight data generation model 311.

Here, in the client terminal 110 or the controller 150, for example, the imaging feature is adjusted using the GUI by the user's operation, whereby the flight control data is generated. Note that the imaging feature parameters may be installed in the UAV in advance together with the flight data generation model 311.

The flight data generation model 311 includes a machine learning model obtained by performing learning using the imaging feature parameter, the imaging intention, and the imaging environment as inputs and using the actual flight data obtained by the UAV actually flying as an output under these conditions.

Figure 16:
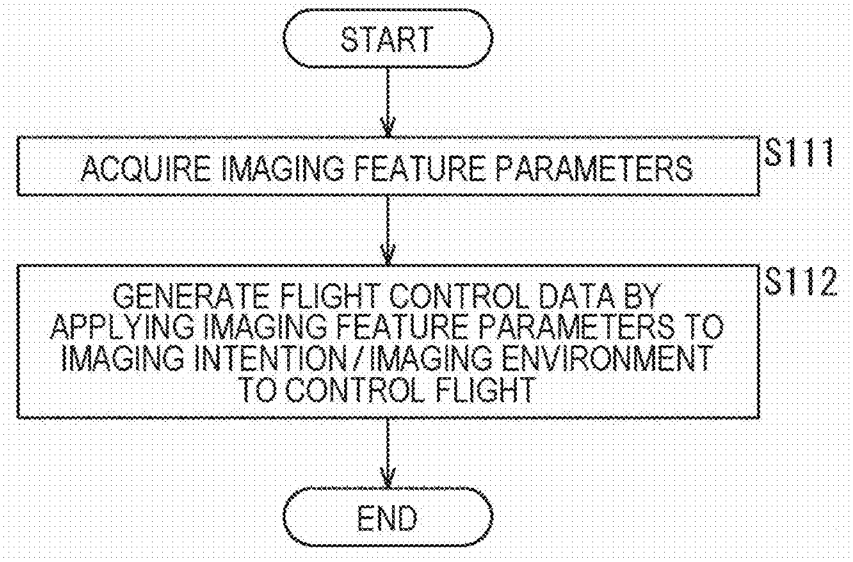
FIG. 16 is a flowchart for explaining a flow of flight control processing.

Next, a flow of flight control processing by the flight control unit 303 in FIG. 15 will be described with reference to a flowchart in FIG. 16. The process of FIG. 16 is started when the controller 150 instructs the moving body 170 (UAV) to start a flight, for example, and is repeated until an instruction to end the flight is given.

In step S111, the flight control unit 303 acquires the imaging feature parameters from the server 130.

In step S112, the flight data generation model 311 generates flight control data by applying the acquired imaging feature parameters to the imaging intention/imaging environment input by the user.

The flight control data sequentially generated in this manner controls the flight of the UAV or controls imaging from the camera mounted on the UAV.

According to the above processing, the imaging feature parameter that is extracted from the captured moving image and is resolvable to the person is applied to the imaging intention and the imaging environment of the user, so that the flight control data is sequentially generated and the flight is controlled. As a result, it is possible to easily realize the intended flight only by adjusting the flight and imaging features that can be interpreted by the user, and eventually, it is possible to more easily capture a moving image desired by the user.

11. Eighth Embodiment (Flight Control Using Moving Image Directly (2))

Figure 17:
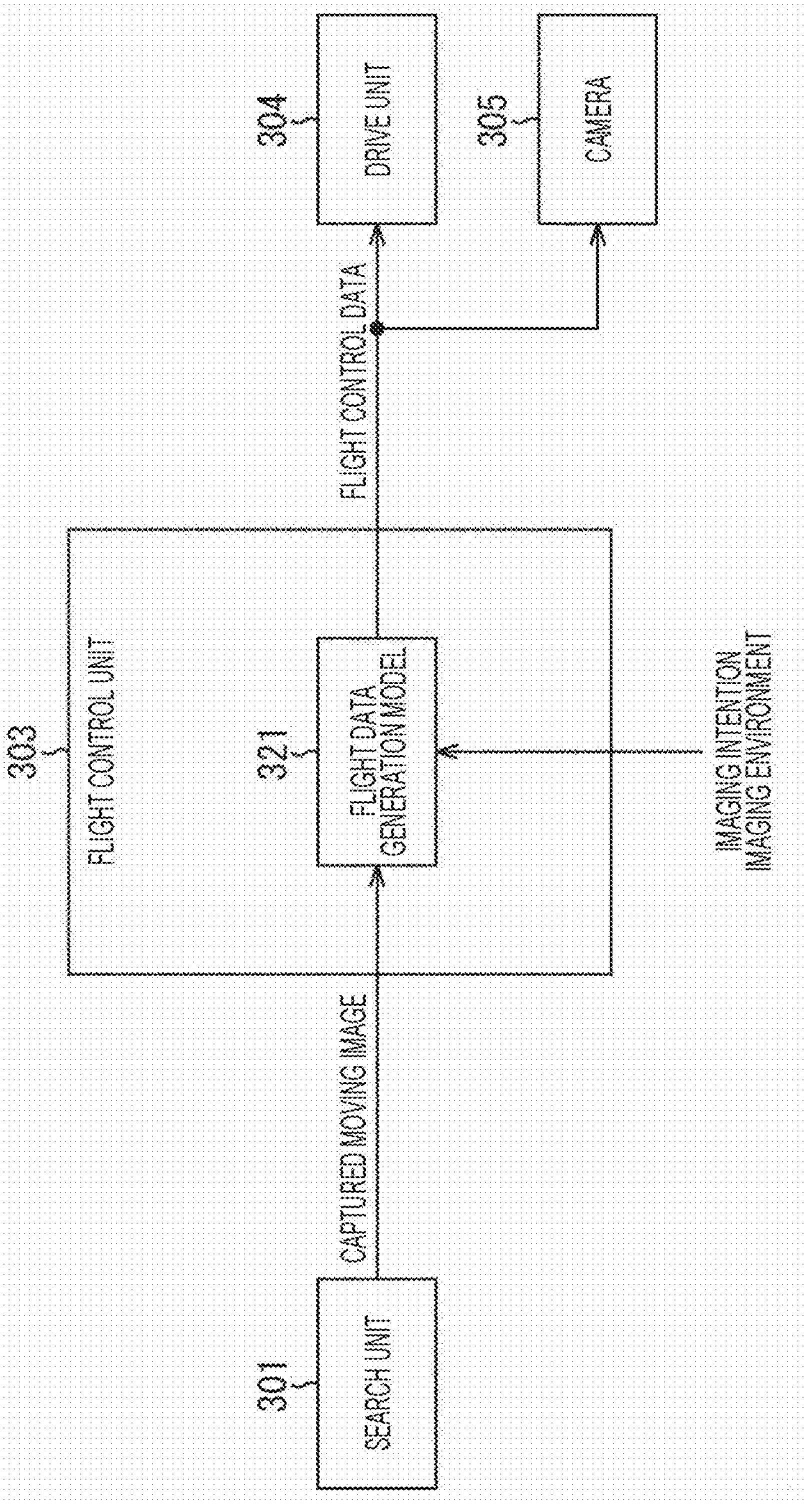
FIG. 17 is a block diagram illustrating a configuration example of a moving body control system according to an eighth embodiment.

FIG. 17 is a block diagram illustrating a configuration example of a moving body control system according to an eighth embodiment of the present disclosure.

In the moving body control system of FIG. 17, the imaging feature extraction unit 302 is not provided, and the flight control unit 303 includes a flight data generation model 321.

The search unit 301 searches for the captured moving image captured from another UAV according to the user's operation, and supplies the searched captured moving image to the flight control unit 303 via the server 130.

The flight data generation model 321 generates flight control data adapted to the imaging intention and the imaging environment input by the user on the basis of the captured moving image from the search unit 301.

Here, in the client terminal 110 or the controller 150, for example, a text indicating an imaging intention or an imaging environment is input or the imaging intention or the imaging environment is selected using the GUI by the user's operation, whereby the flight control data is generated.

The flight data generation model 321 includes a machine learning model obtained by performing learning using the moving image, the imaging intention, and the imaging environment as inputs and using the actual flight data obtained by the UAV actually flying as an output under these conditions.

Figure 18:
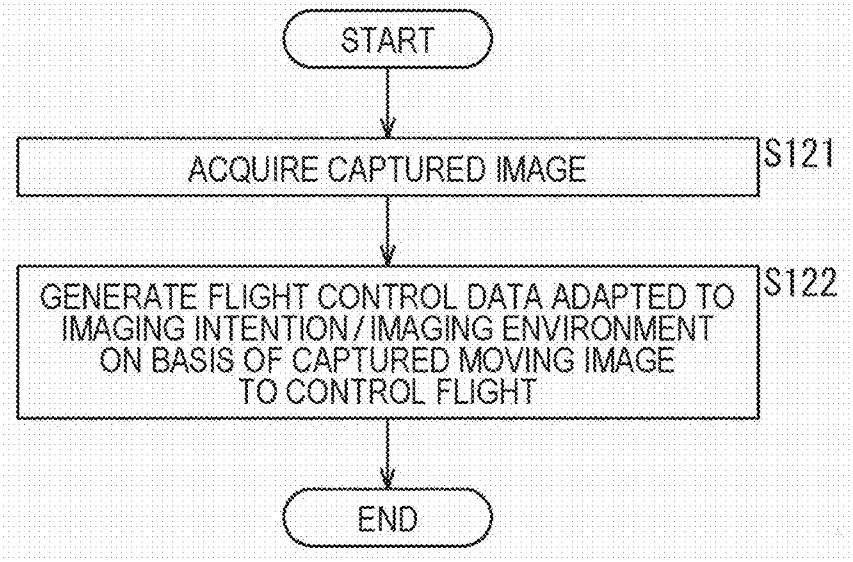
FIG. 18 is a flowchart for explaining a flow of flight control processing.

Next, a flow of flight control processing by the flight control unit 303 in FIG. 17 will be described with reference to a flowchart in FIG. 18. The process of FIG. 18 is started when the controller 150 instructs the moving body 170 (UAV) to start a flight, for example, and is repeated until an instruction to end the flight is given.

In step S121, the flight control unit 303 acquires the captured image from the search unit 301.

In step S122, the flight data generation model 321 generates flight control data adapted to the imaging intention and the imaging environment input by the user on the basis of the captured moving image from the search unit 201.

The flight control data sequentially generated in this manner controls the flight of the UAV or controls imaging from the camera mounted on the UAV.

According to the above processing, the flight control data adapted to the imaging intention and the imaging environment of the user is sequentially generated on the basis of the captured moving image, and the flight is controlled. As a result, it is possible to easily realize the intended flight only by the user inputting his/her own imaging intention or an imaging environment in which the UAV is desired to fly, and eventually, it is possible to more easily capture a moving image desired by the user.

Although the embodiments in which the flight control data is generated in advance (the flight plan is created in advance) and the embodiments in which the sequential flight control data is generated (the sequential execution of the flight control) have been described above, these may be combined.

For example, a via-point (coordinates) on a flight route is manually designated in advance by creating a flight plan in advance, and between the via-points, flight reflecting an imaging intention can be realized by sequentially executing flight control.

In addition, by setting a flight route that loops the via-point by creating a flight plan in advance, it is possible to realize a flight in which an imaging intention is reflected by sequentially executing flight control while realizing an intended flight.

Furthermore, flight control data generated for a certain environment may be cut and pasted by geometric editing by creating a flight plan in advance, and the same flight may be repeated for a long time by performing partial reverse reproduction, end point connection, and the like.

<12. Cases Where Technology According to Present Disclosure Can Be Applied>

Hereinafter, cases where the technology according to the present disclosure can be applied will be described.

(First Case)

Figure 19:
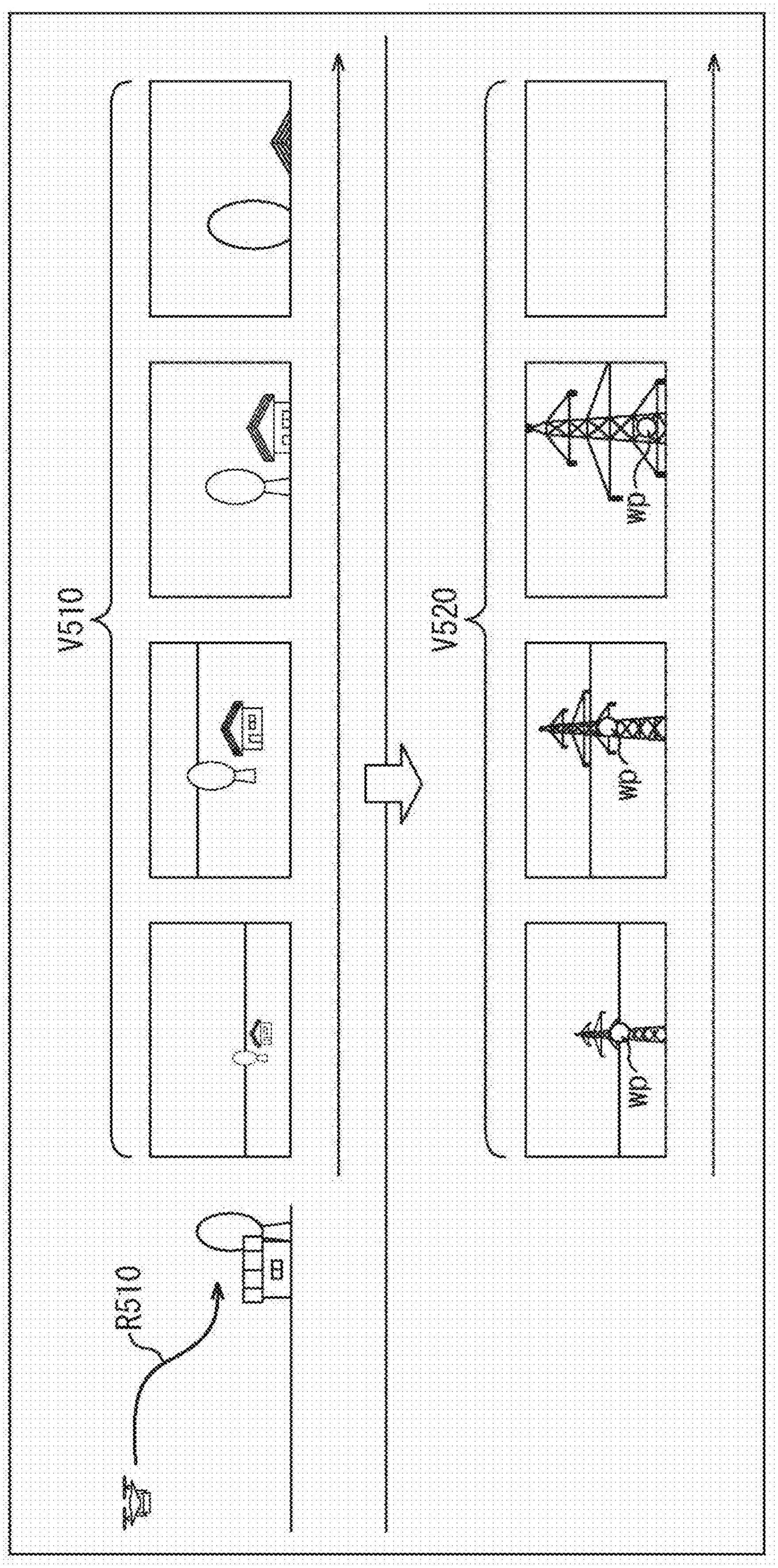
FIG. 19 is a diagram for explaining a case to which the technology according to the present disclosure can be applied.

FIG. 19 is a diagram for explaining a first case to which the technology according to the present disclosure can be applied.

The upper part of FIG. 19 illustrates a captured moving image V510 captured from the moving body (UAV) that has flown along the route R510. The captured moving image V510 is a moving image captured from the UAV flying while grazing the roof of the house that is the notable subject.

The lower part of FIG. 19 illustrates a moving image V520 desired by the user, captured from the UAV flying according to the flight control data generated on the basis of the captured moving image V510. The moving image V520 is a moving image captured by the UAV flying by grazing the side of the steel tower as the notable subject while descending.

The captured moving image V510 and the moving image V520 have a common composition in which the notable subject is kept within the angle of view until the moving body passes near the notable subject and route in which the moving body descends while approaching the notable subject from a distance and passes near the notable subject. This can be realized, for example, by the imaging feature parameter directly or indirectly extracted from the captured moving image V510.

Meanwhile, the captured moving image V510 and the moving image V520 are different from each other in the size (height) of the notable subject, and accordingly, the scale of the route is different, so that the distance and the flight speed of the entire route are different. This can be realized, for example, by applying the imaging feature parameter directly or indirectly extracted from the captured moving image V510 to the imaging intention of the user.

At this time, the target object to be the notable subject is selected in the captured moving image V510, and the target object (gaze point wp) to be the notable subject in the moving image V520 needs to be designated by the user at the start of capturing the moving image V520.

The case of FIG. 19 can be realized by the moving body control system of any one of the first to sixth embodiments in which the flight and imaging of the UAV are controlled by the flight control data generated in advance.

(Second Case)

Figure 20:
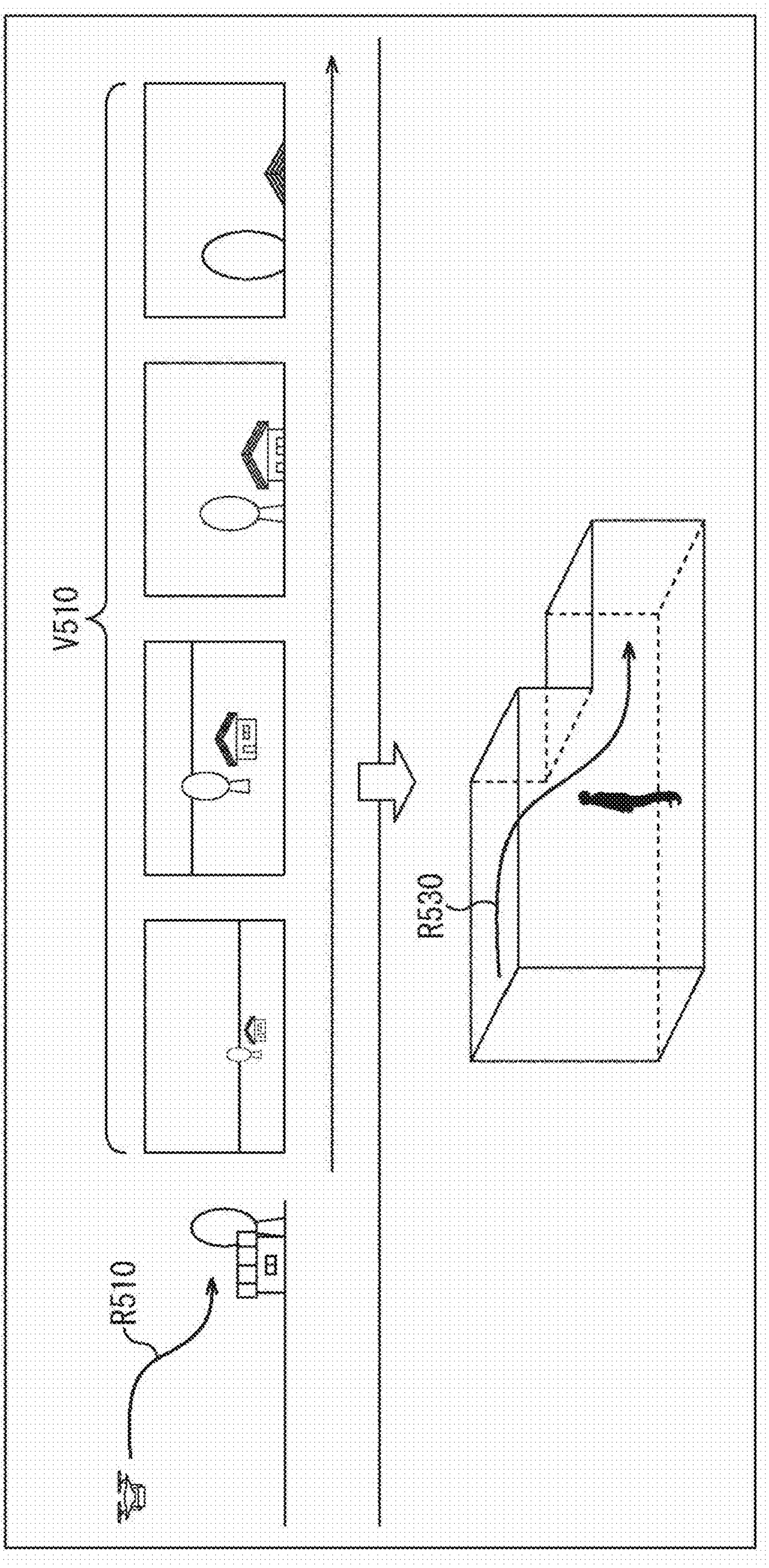
FIG. 20 is a diagram for explaining a case to which the technology according to the present disclosure can be applied.

FIG. 20 is a diagram for explaining a second case to which the technology according to the present disclosure can be applied.

Similarly to FIG. 19, the upper part of FIG. 20 illustrates a captured moving image V510 captured from the moving body (UAV) that has flown along the route R510.

The lower part of FIG. 20 illustrates a route R530 of the UAV that has flown by the flight control data generated on the basis of the captured moving image V510. The moving image captured by the flight along the route R530 is a moving image captured from the UAV flying while grazing on the person who is the notable subject indoors.

The captured moving image V510 and the moving image captured by the flight along the route R530 have a common composition in which the notable subject is kept within the angle of view until the moving body passes near the notable subject and route in which the moving body descends while approaching the notable subject from a distance and passes near the notable subject. This can be realized, for example, by the imaging feature parameter directly or indirectly extracted from the captured moving image V510.

Meanwhile, the captured moving image V510 and the moving image captured by the flight along the route R530 are different from each other in the size (height) of the notable subject and the scale of the route, so that the distance and the flight speed of the entire route are different from each other. Furthermore, since the route R530 is an indoor flight, a contract is made in the structure of the environment. This can be realized, for example, by applying the imaging feature parameters directly or indirectly extracted from the captured moving image V510 to the user's imaging intention and imaging environment.

The case of FIG. 20 can also be realized by the moving body control system of any one of the first to sixth embodiments in which the flight and imaging of the UAV are controlled by the flight control data generated in advance.

(Third Case)

Figure 21:
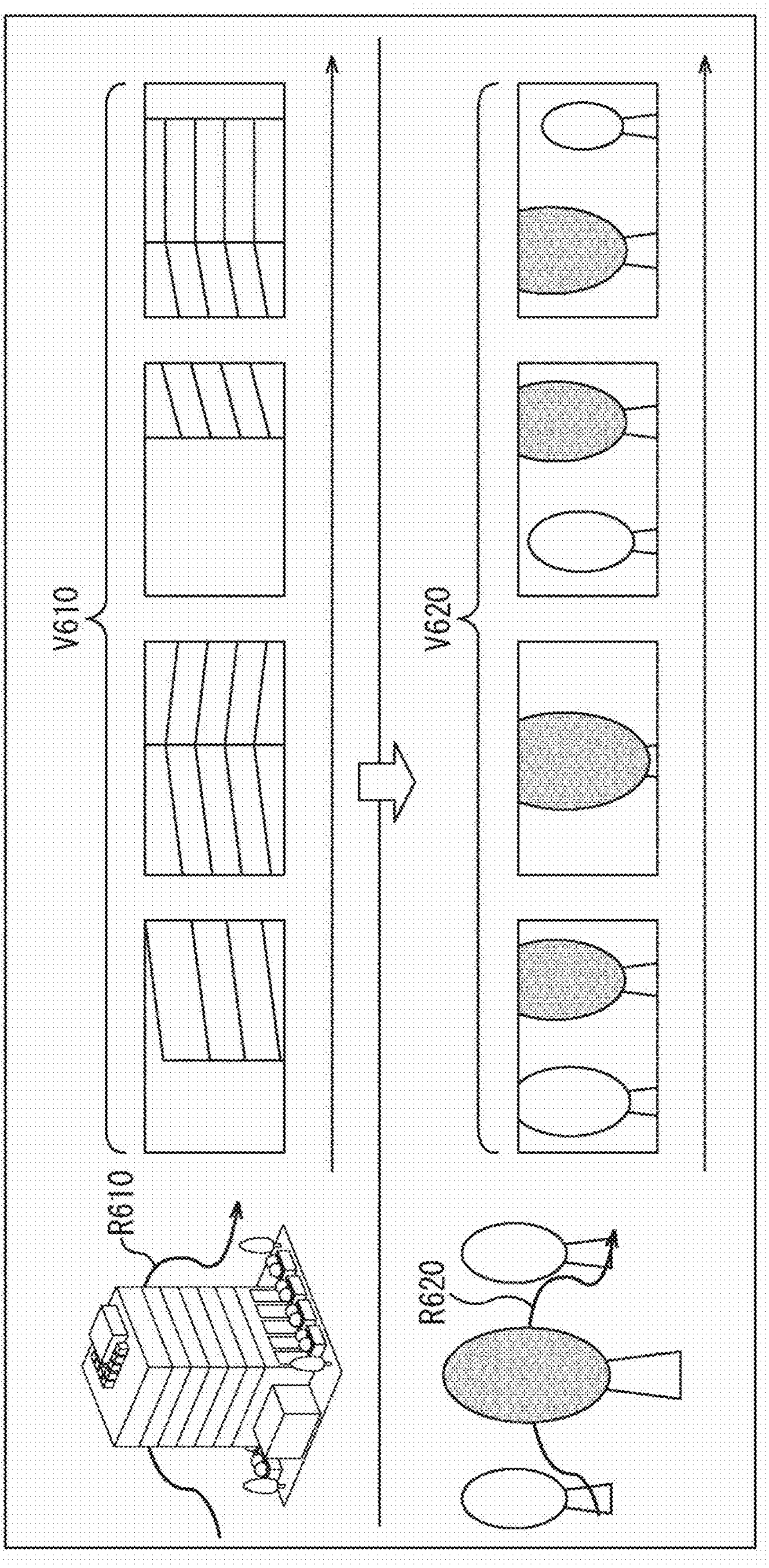
FIG. 21 is a diagram for explaining a case to which the technology according to the present disclosure can be applied.

FIG. 21 is a diagram for explaining a third case to which the technology according to the present disclosure can be applied.

The upper part of FIG. 21 illustrates a captured moving image V610 captured from the moving body (UAV) that has flown along the route R610. The captured moving image V610 is a moving image captured from the UAV flying around a building that is a notable subject while capturing the building.

In the lower part of FIG. 21, a route R620 of the UAV flying according to the flight control data generated on the basis of the captured moving image V610 and a moving image V620 desired by the user captured by the flight along the route R620 are illustrated. The moving image V620 is a moving image captured from the UAV that flies while avoiding other trees around one tree that is the notable subject while capturing the one tree.

The captured moving image V610 and the moving image V620 have a common composition of a route (routes R610 and R620) for turning around the notable subject and a composition for keeping the notable subject within the angle of view while turning. This can be realized, for example, by the imaging feature parameter directly or indirectly extracted from the captured moving image V610.

Meanwhile, the captured moving image V610 and the moving image V620 are different from each other in the size of the notable subject, and accordingly, the scale of the route is different, so that the distance and the flight speed of the entire route are different. Furthermore, since the route R620 is a flight avoiding other trees, a contract is made in the structure of the environment. This can be realized, for example, by applying the imaging feature parameters directly or indirectly extracted from the captured moving image V610 to the user's imaging intention and imaging environment. Here, the route R620 may be changed according to the structure of the environment (interval between trees).

The case of FIG. 21 can also be realized by the moving body control system of any one of the first to sixth embodiments in which the flight and imaging of the UAV are controlled by the flight control data generated in advance.

(Fourth Case)

Figure 22:
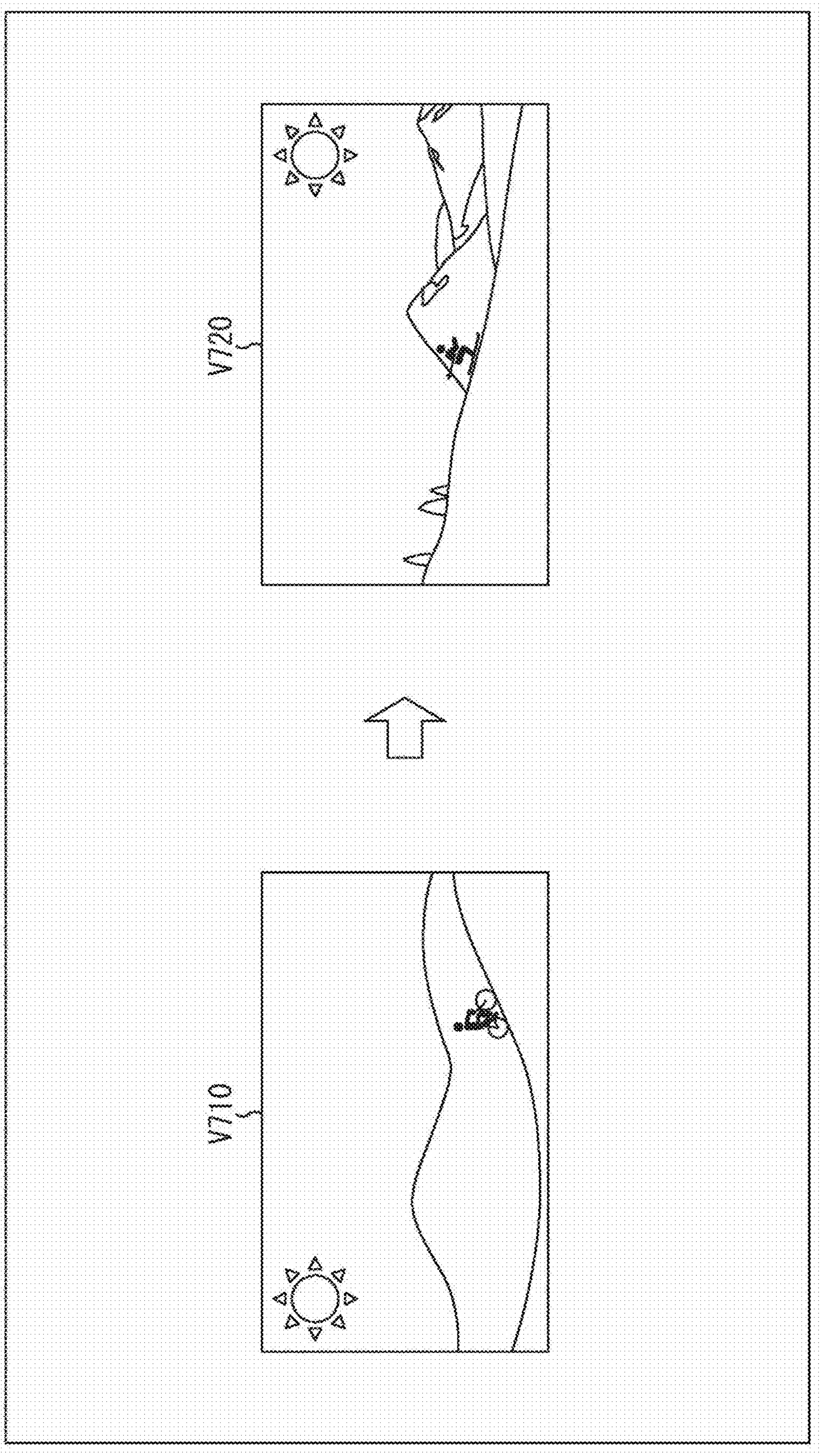
FIG. 22 is a diagram for explaining a case to which the technology according to the present disclosure can be applied.

FIG. 22 is a diagram for explaining a fourth case to which the technology according to the present disclosure can be applied.

The left part of FIG. 22 illustrates one cut of a captured moving image V710 captured from a moving body (UAV) flying parallel with a person cycling in summer mountain.

The right part of FIG. 22 illustrates one cut of a moving image V710 captured from a UAV flying in parallel with a person skiing in winter mountains by flight control based on the captured moving image V720.

The captured moving image V710 and the moving image V720 are common in the position of the light source (sun) in the screen (the point that the sun is located in the upper part of the screen) and the scale feeling, the position, and the posture of the person who is the notable subject in the screen (the point that the person moves sideways at the bottom of the screen). Furthermore, in the captured moving image V710 and the moving image V720, the positional relationship between the ground and the camera (point at which the UAV is flying at a low altitude near the ground) and the ratio of the background on the screen (point at which the upper half of the screen is the background) are common. This can be realized, for example, by the imaging feature parameter directly or indirectly extracted from the captured moving image V710.

Meanwhile, the moving direction (up or down the slope) of the person who is the notable subject, the season and place of the environment, the state of the background, and the presence or absence of an obstacle are different between the captured moving image V710 and the moving image V720. Furthermore, the number of notable subjects may be different between the captured moving image V710 and the moving image V720. This can be realized, for example, by applying the imaging feature parameters directly or indirectly extracted from the captured moving image V710 to the user's imaging intention and imaging environment.

The case of FIG. 22 can be realized by the moving body control system of the seventh or eighth embodiment in which the flight and imaging of the UAV are controlled by the sequentially generated flight control data since it is necessary to track the notable subject having a moving direction different from that of the captured moving image V720 in the moving image V710.

(Fifth Case)

Figure 23:
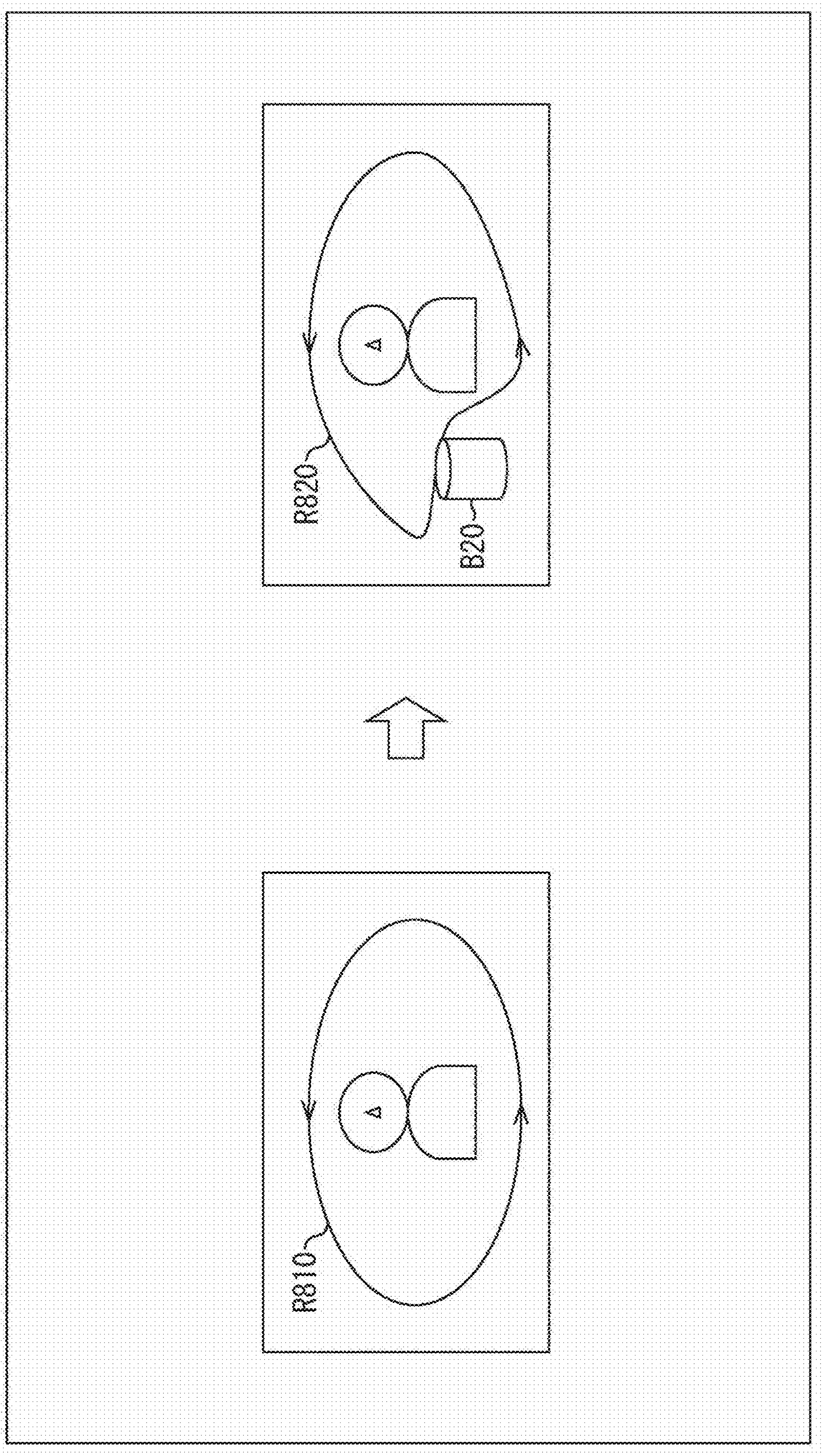
FIG. 23 is a diagram for explaining a case to which the technology according to the present disclosure can be applied.

FIG. 23 is a diagram for explaining a fifth case to which the technology according to the present disclosure can be applied.

The left part of FIG. 23 illustrates a route R810 of a moving body (UAV) circling around a person while imaging (bust shot) the upper side of the person's chest in an open space without an obstacle or the like.

On the right side of FIG. 23, a route R810 of the UAV that flies according to the flight control data generated on the basis of the captured moving image captured by the flight along the route R820 in the space where the obstacle B20 exists is illustrated.

The image capturing on the route R810 and the image capturing on the route R820 are common in the appearance (point of bust shot) of the person as the notable subject in the moving image. This can be realized, for example, by the imaging feature parameter directly or indirectly extracted from the captured moving image on the route R810.

Meanwhile, since there is the obstacle B20 in the imaging on the route R820, the route R820 is a route that avoids the obstacle B20 unlike the route R820. This can be realized, for example, by applying the imaging feature parameters directly or indirectly extracted from the captured moving image V810 to the user's imaging intention and imaging environment.

In particular, since the obstacle B20 is near the front of the person, the imaging on the route R820 is performed to achieve the imaging intention to cleanly capture the upper body of the person.

Figure 24:
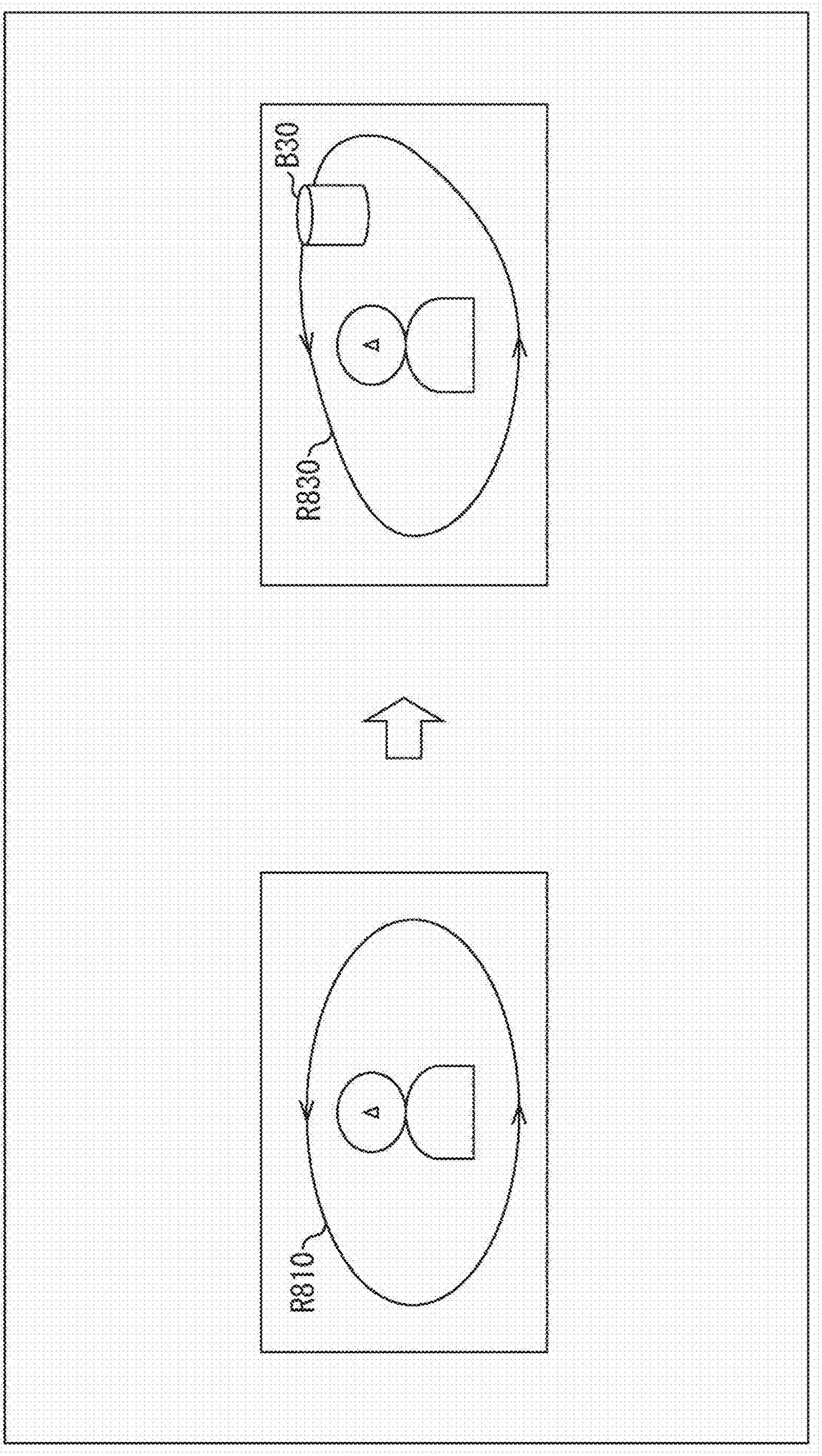
FIG. 24 is a diagram for explaining a case to which the technology according to the present disclosure can be applied.

Note that, as illustrated in FIG. 24, in a case where the obstacle B30 is present near the back surface of the person, a moving image may be captured along the route R830 in which the obstacle B30 is captured. The imaging on the route R830 is such imaging to achieve the imaging intention to cleanly capture the upper body of the person while allowing some reflection of the obstacle B30.

As described above, in a case where an obstacle exists in the environment, not only the obstacle is simply avoided, but also a route for avoiding the obstacle while achieving the imaging intention can be set.

The cases of FIGS. 23 and 24 can be realized by the moving body control system according to any one of the first to sixth embodiments in which the flight and imaging of the UAV are controlled by the flight control data generated in advance.

<13. Example of Imaging Intention (Imaging Feature Parameter)>

An example of the imaging feature parameter applied to the imaging intention of the user will be described. Here, the imaging feature parameter and the imaging intention are assumed to be synonymous. The imaging intention includes an imaging intention that does not consider time (is constant regardless of the lapse of time) and an imaging intention that considers time (can change depending on a time result).

A. Example of Imaging Intention Not Considering Time (1) Position of Subject in Screen It is a composition when the subject in front of the camera is captured in the screen, and examples thereof include the composition of the disc of the sun in which the subject is captured in the center of the screen. The coordinate position of the center of the subject in the screen is set as a parameter. In which region of the regions divided by the three-division method the center of the subject is located may be set as a parameter.

(2) Position of Light Source in Screen

Figure 25:
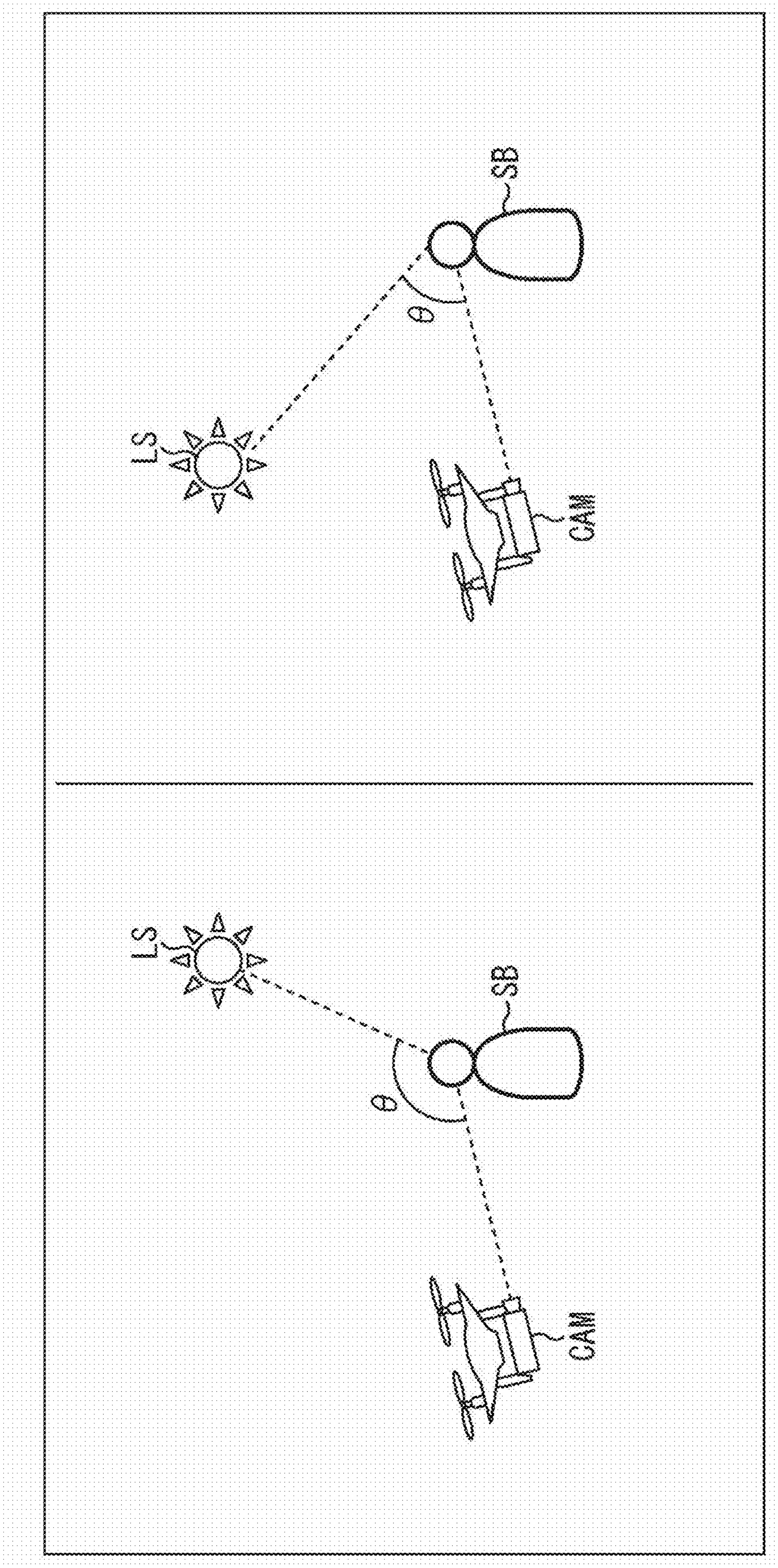
FIG. 25 is a diagram illustrating an example of imaging feature parameters.

For example, as illustrated in FIG. 25, an angle θ in a horizontal plane formed by the camera CAM, the subject SB, and the light source LS such as the sun and illumination is set as a parameter.

An example of $90° < \theta < 270°$ is illustrated on the left side of FIG. 25, in which the subject SB is backlit by the light. An example of $0° < \theta < 90°$ ($270° < \theta < 360°$) is illustrated on the right side of FIG. 25, in which the light hitting the subject SB is front light. Note that, although not illustrated, the light source LS is located on the left side in the screen in a case where $90° < \theta < 180°$, and the light source LS is located on the right side in the screen in a case where $180° < \theta < 270°$.

Instead of the angle θ, the user may specify how light such as front lighting or back lighting hits and the position (right side or left side) of the light source LS in the screen.

(3) Scale Feeling and Posture of Person

As the scale feeling of a person, for example, how much of a human skeleton is illustrated is set as a parameter. Specifically, in a case where only the face is illustrated, the face-up imaging is performed, and in a case where the chest or the waist is illustrated from the face, the bust-up imaging is performed. In addition, in a case where the face to the toe is reflected, the whole-body imaging is performed.

(4) Positional Relationship Between Ground and Camera

Figure 26:
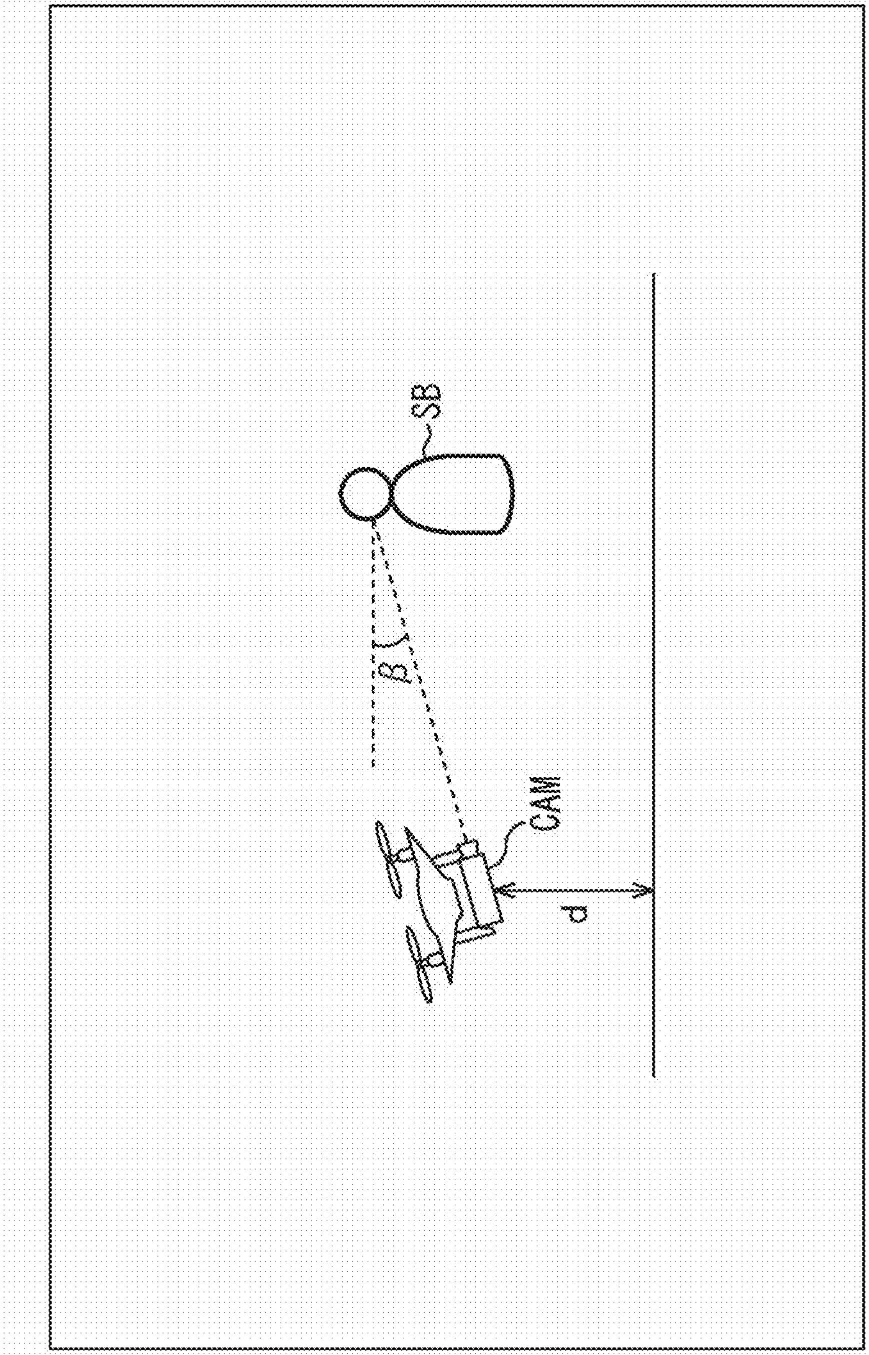
FIG. 26 is a diagram illustrating an example of imaging feature parameters.

As illustrated in FIG. 26, a distance d in the vertical direction between the camera CAM and the ground is set as a parameter. In particular, by setting the distance d to be small, it is possible to capture a moving image having a sense of running fast.

(5) Ratio of Background on Screen

The ratio of the background on the screen is obtained as a ratio α of a region deeper than the subject extracted by determining the depth of the subject using the monocular depth estimation technique to the entire screen (entire pixels). The ratio α is set as a parameter.

(6) How Person Appears

An imaging intention whether the upper body of the person is to be captured clearly, that is, whether the composition is a tilt composition or a bird's eye composition is set. Specifically, the posture β of the camera CAM with respect to the subject SB illustrated in FIG. 26 is set as a parameter.

(7) Geometric Posture of Camera

As the orientation of the camera, an angle φ1 in the horizontal direction and an angle φ2 in the vertical direction in the three-dimensional coordinate system may be set. Instead of the angles φ1 and φ2, an angle to look up, an angle to look down, a position directly below, or the like may be designated by the user. The orientation of the camera can also be indirectly set by other parameters.

(8) Size of Subject in Screen

Figure 27:
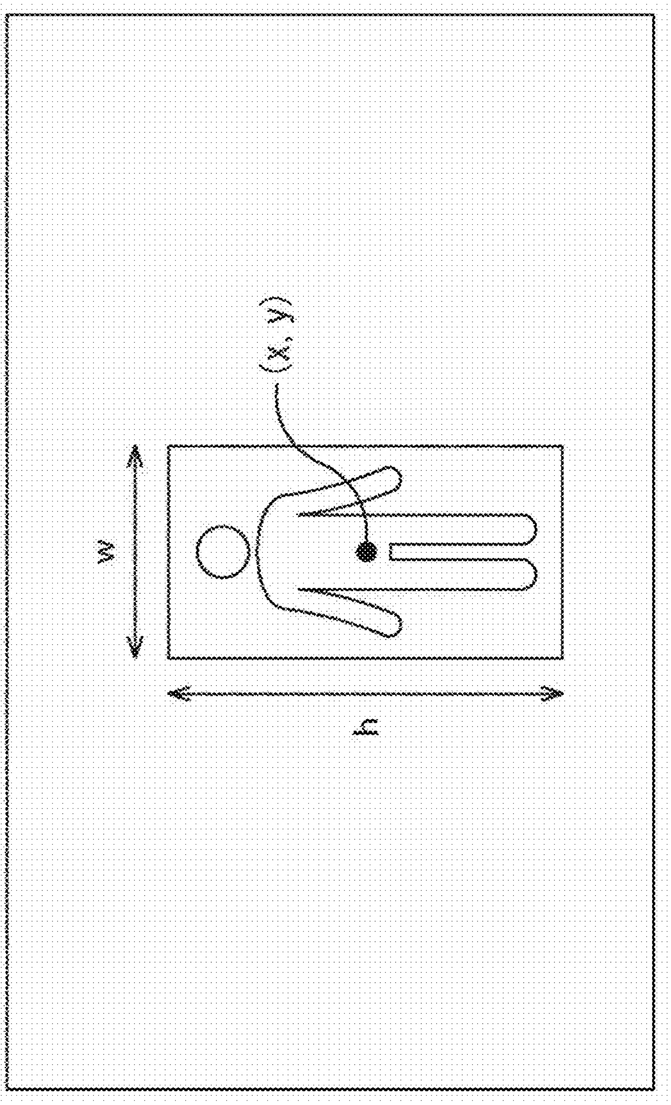
FIG. 27 is a diagram illustrating an example of imaging feature parameters.

As illustrated in FIG. 27, the vertical width h and the horizontal width w of the detection frame in which the subject is detected may be set as the size of the subject with respect to the screen. Instead of the vertical width h and the horizontal width w, a size level such as large, medium, or small may be designated by the user. Furthermore, the position of the subject in the screen described above in (1) may be set by the center coordinates (x, y) of the detection frame illustrated in FIG. 27, or a preset position in the screen may be designated by the user.

(9) Shake of Entire Screen

As the shake of the entire screen, the frequency ν (Hz) and the shake width s (pixel) may be set by using a motion estimation technology by dense optical flow. Instead of the frequency ν and the shake width s, a preset shake such as walking, running, train, car, or off-road car may be prepared and specified by the user.

B. Example of Imaging Intention Considering Time

(10) Zoom In/Zoom Out

A zoom ratio is set as a parameter. The zoom ratio can be defined by, for example, a change in a focal length x (mm) in terms of 35 mm per second by ±y (mm), a relative change in a size of a subject from a moving image at the start of imaging by z % per second, or the like.

(11) Followability With Respect to Rapidly Moving Subject

The maximum angular velocity and the maximum angular acceleration of the camera in panning and tilting, and the maximum speed and the maximum acceleration of the camera in translational movement are set as how much the camera follows the movement of the subject such as the jump and the start of running.

(12) Relationship With Dynamic Obstacle

Whether to avoid a moving obstacle so as not to appear or to allow the obstacle to be hidden by the subject (occlusion) may be selectively set. For example, after a route with minimum occlusion is calculated, a prohibited region around the obstacle is set, and the route is distorted in a direction to avoid the obstacle in accordance with the set prohibited region, whereby a route in which the obstacle does not appear can be set.

(13) Speed of Camerawork

For example, slow camerawork may be set in a scene with high importance, and quick camerawork may be set in a scene with low importance.

(14) Synchronization With Motion of Subject

For example, in a case where a person who is a subject dances in accordance with music, camerawork and movement may be set to be controlled in accordance with rhythm of the music.

(15) Change in Positional Relationship With Subject

As a change in the positional relationship with the subject, a stereoscopic camerawork in a three-dimensional space may be set.

For example, in a scene where an image is captured so as to go around the subject, left and right turning, ascending/descending, angular velocity, and the like of the camera (moving body) are set. In a scene where an image is captured so as to cross in front of a subject, left and right turning, ascending/descending, speed, and the like of the camera (moving body) are set. In a scene in which an image is captured while approaching or moving away from a subject, a closest distance between the camera (moving body) and the subject, ascending/descending, angular velocity, and the like are set.

Figure 28:
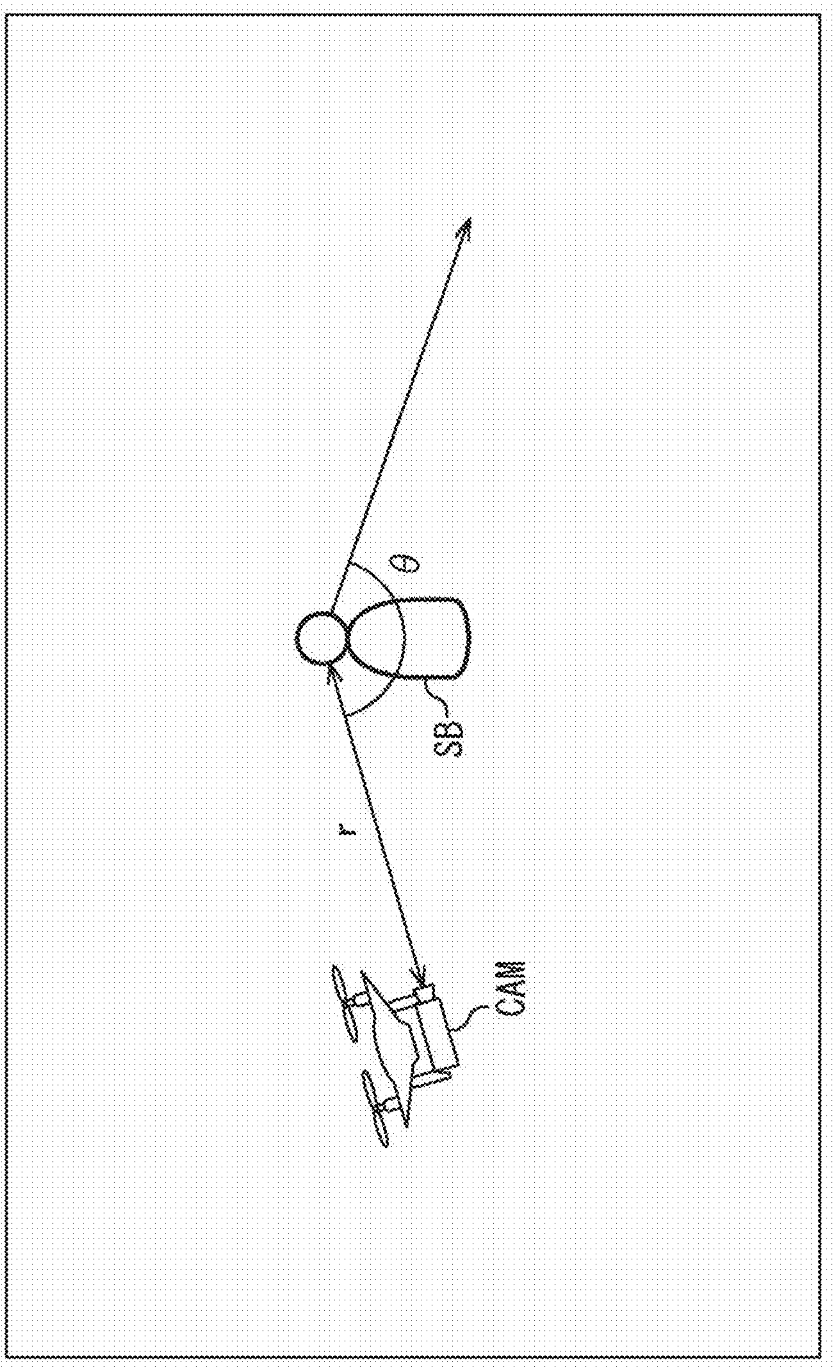
FIG. 28 is a diagram illustrating an example of imaging feature parameters.

In a scene where an image is captured while following the movement of the subject or running in parallel, the distance r between the camera CAM and the subject SB and the angle θ of the moving direction of the subject SB are set as the positional relationship with the subject as illustrated in FIG. 28. Here, the maximum angular velocity, the maximum angular acceleration, the maximum speed, and the maximum acceleration of the camera described above in (11) may be further set.

<14. Configuration Example of Computer>

The series of processing steps described above can be executed by hardware and also can be executed by software. In a case where the series of processing is executed by software, a program constituting the software is installed in a computer. Here, examples of the computer include a computer incorporated in dedicated hardware, and for example, a general-purpose personal computer capable of executing various functions by installing various programs or the like.

Figure 29:
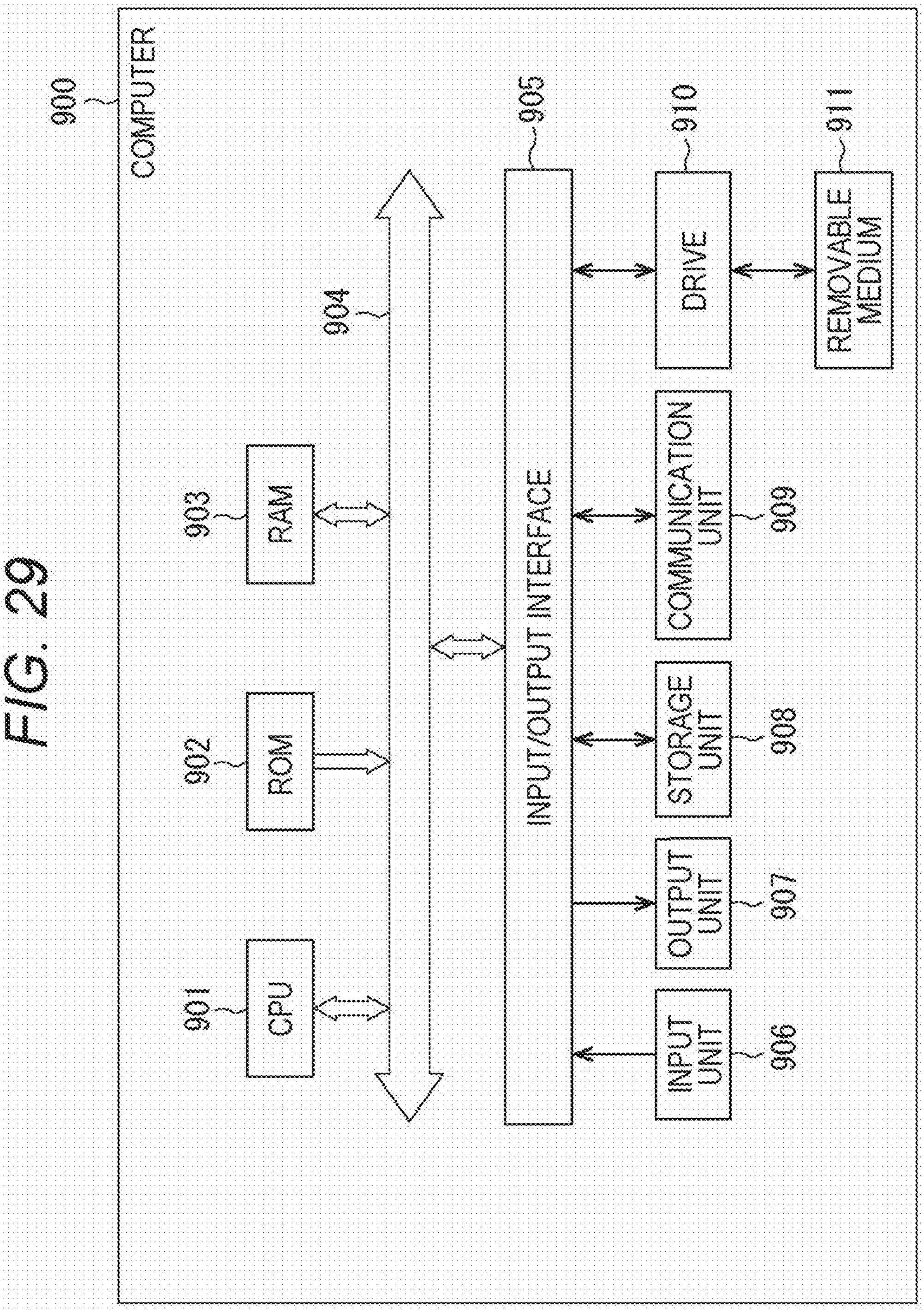
FIG. 29 is a diagram illustrating a configuration example of a computer.

FIG. 29 is a block diagram illustrating a configuration example of hardware of a computer that executes the series of processing described above in accordance with a program.

In the computer, a CPU 901, a read only memory (ROM) 902, and a random access memory (RAM) 903 are connected to one another through a bus 904.

An input/output interface 905 is further connected to the bus 904. An input unit 906, an output unit 907, a storage unit 908, a communication unit 909, and a drive 910 are connected to the input/output interface 905.

The input unit 906 includes a keyboard, a mouse, a microphone, and the like. The output unit 907 includes a display, a speaker and the like. The storage unit 908 includes a hard disk, a non-volatile memory and the like. The communication unit 909 includes a network interface and the like. The drive 910 drives a removable medium 911 such as a magnetic disk, an optical disk, a magneto-optical disk, or a semiconductor memory.

In the computer configured in the above described manner, the CPU 901 loads the program stored in the storage unit 908, for example, on the RAM 903 through the input/output interface 905 and the bus 904 to execute, and according to this, the above-described series of processing is performed.

The program executed by the computer (CPU 901) can be provided, for example, by being recorded in the removable medium 911 as a package medium and the like. Further, the program can be provided via a wired or wireless transmission medium such as a local area network, the Internet, or digital satellite broadcasting.

In the computer, the program can be installed in the storage unit 908 via the input/output interface 905 by mounting the removable medium 911 on the drive 910. Furthermore, the program may be received by the communication unit 909 via a wired or wireless transmission medium to be installed on the storage unit 908. In addition, the program may be installed in advance on the ROM 902 and the storage unit 908.

Note that the program executed by the computer may be a program that performs processing in a time series according to an order described in the present specification, or may be a program that performs processing in parallel or at necessary timing such as when a call is made.

The embodiments of the present disclosure are not limited to the above-described embodiments, and various modifications can be made without departing from the gist of the present disclosure.

The effects described in the present specification are merely examples and are not limited, and other effects may be provided.

Moreover, the technology according to the present disclosure can have the following configurations.

(1)

A data processing method in which a data processing device is configured to generate control data corresponding to a moving route of a first moving body for controlling movement of a second moving body on the basis of a first moving image captured from the first moving body.

(2)

The data processing method according to (1), in which at least one of movement of the second moving body or imaging from the second moving body is controlled on the basis of the control data generated in advance on the basis of the first moving image.

(3)

The data processing method according to (2), in which movement data including the moving route of the first moving body is estimated on the basis of the first moving image, and the control data is generated by editing the movement data estimated.

(4)

The data processing method according to (2), in which the control data is generated in which at least one of an imaging intention or an imaging environment of a user with respect to a second moving image captured from the second moving body is reflected.

(5)

The data processing method according to (4), in which the control data is output by a machine learning model having at least one of the imaging intention or the imaging environment as an input.

(6)

The data processing method according to (4) or (5), in which the imaging intention includes at least one of a composition or an angle of view of the second moving image.

(7)

The data processing method according to (6), in which the imaging environment includes a geometric shape of an imaging target or a capturable target around the second moving body.

(8)

The data processing method according to any one of (4) to (7), in which movement data including the moving route of the first moving body is estimated on the basis of the first moving image, an imaging feature parameter of the first moving image is extracted from the movement data estimated, and the control data is generated by applying the imaging feature parameter extracted to the imaging intention.

(9)

The data processing method according to any one of (4) to (7), in which movement data including the moving route of the first moving body is estimated on the basis of the first moving image, and the control data is generated by adapting the movement data estimated to the imaging environment.

(10)

The data processing method according to any one of (4) to (7), in which an imaging feature parameter is extracted from the first moving image, and the control data is generated by applying the imaging feature parameter extracted to the imaging intention.

(11)

The data processing method according to any one of (4) to (7), in which the control data adapted to the imaging environment is generated on the basis of the first moving image.

(12)

The data processing method according to (1), in which at least one of movement of the second moving body or imaging from the second moving body is controlled on the basis of the control data sequentially generated on the basis of the first moving image.

(13)

The data processing method according to (12), in which the control data is generated in which at least one of an imaging intention or an imaging environment of a user with respect to a second moving image captured from the second moving body is reflected.

(14)

The data processing method according to (13), in which the control data is output by a machine learning model having at least one of the imaging intention or the imaging environment as an input.

(15)

The data processing method according to (13) or (14), in which the imaging intention includes at least one of a composition or an angle of view of the second moving image.

(16)

The data processing method according to any one of (13) to (15), in which the control data is generated by applying the imaging feature parameter extracted from the first moving image to the imaging intention.

(17)

The data processing method according to any one of (13) to (15), in which the control data adapted to the imaging environment is generated on the basis of the first moving image.

(18)

A data processing device including a data generation unit that generates control data corresponding to a moving route of a first moving body for controlling movement of a second moving body on the basis of a moving image captured from the first moving body.

(19)

A program for causing a computer to execute processing of generating control data corresponding to a moving route of a first moving body for controlling movement of a second moving body on the basis of a moving image captured from the first moving body.

(20)

A moving body control system including:

a data processing device that generates control data corresponding to a moving route of a first moving body for controlling movement of a second moving body on the basis of a moving image captured from the first moving body; and the second moving body that moves on the basis of the control data.

REFERENCE SIGNS LIST

1 Moving body control system
10 Data processing device
11 Data generation unit
20 Moving body
20C Camera
100 Moving body control system
110 Client terminal
130 Server
150 Controller
170 Moving body
201 Search unit
202 Flight data generation unit
203 Simulation unit
204 UAV
301 Search unit
302 Imaging feature extraction unit
303 Flight control unit
304 Drive unit
305 Camera

The invention claimed is:

1. A data processing method to be executed by a data processing device, the method comprising:

acquiring a first moving image which was captured from a first moving body; and generating, from the first moving image, control data corresponding to a route of the first moving body from which the first moving image was captured, the control data being for controlling at least one of movement of a second moving body or imaging from the second moving body, wherein the control data reflects at least one of an imaging intention or an imaging environment input by a user regarding a second moving image to be captured from the second moving body, the imaging intention includes at least one of a composition or an angle of view of the second moving image, and the imaging environment includes a geometric shape of an imaging target or a capturable target around the second moving body.

2. The data processing method according to claim 1, wherein the control data is generated from the first moving image before the movement of the second moving body or the imaging from the second moving body occurs.

3. The data processing method according to claim 2, further comprising:

estimating, from the first moving image, movement data of the first moving body including the route of the first moving body, wherein the control data is generated by editing the movement data that was estimated.

4. The data processing method according to claim 2, wherein the control data is output by a machine learning model having at least one of the imaging intention or the imaging environment as an input.

5. The data processing method according to claim 2, further comprising:

estimating, from the first moving image, movement data of the first moving body including the route of the first moving body; and extracting an imaging feature parameter of the first moving image from the movement data that was estimated, wherein the control data is generated by applying the imaging feature parameter that was extracted to the imaging intention.

6. The data processing method according to claim 2, further comprising:

estimating, from the first moving image, movement data of the first moving body including the route of the first moving body, wherein the control data is generated by modifying, according to the imaging environment, the movement data that was estimated.

7. The data processing method according to claim 2, further comprising:

extracting an imaging feature parameter from the first moving image, wherein the control data is generated by applying the imaging feature parameter that was extracted to the imaging intention.

8. The data processing method according to claim 2, wherein the control data that is in accordance with the imaging environment is generated from the first moving image.

9. The data processing method according to claim 1, wherein the control data is sequentially generated from the first moving image.

10. The data processing method according to claim 9, wherein the control data is output by a machine learning model having at least one of the imaging intention or the imaging environment as an input.

11. The data processing method according to claim 9, wherein the control data is generated by applying an imaging feature parameter extracted from the first moving image to the imaging intention.

12. The data processing method according to claim 9, wherein the control data that is in accordance with the imaging environment is generated from the first moving image.

13. A data processing device comprising:

circuitry including a processor that is configured to acquire a first moving image which was captured from a first moving body, and generate, from the first moving image, control data corresponding to a route of the first moving body from which the first moving image was captured, the control data being for controlling at least one of movement of a second moving body or imaging from the second moving body, wherein the control data reflects at least one of an imaging intention or an imaging environment input by a user regarding a second moving image to be captured from the second moving body, the imaging intention includes at least one of a composition or an angle of view of the second moving image, and the imaging environment includes a geometric shape of an imaging target or a capturable target around the second moving body.

14. A non-transitory computer-readable storage medium storing a program for causing a computer to execute processing of:

acquiring a first moving image which was captured from a first moving body; and generating, from the first moving image, control data corresponding to a route of the first moving body from which the first moving image was captured, the control data being for controlling at least one of movement of a second moving body or imaging from the second moving body, wherein the control data reflects at least one of an imaging intention or an imaging environment input by a user regarding a second moving image to be captured from the second moving body, the program further causes the computer to execute further processing of estimating, from the first moving image, movement data of the first moving body including the route of the first moving body; and extracting an imaging feature parameter of the first moving image from the movement data that was estimated, and the control data is generated by applying the imaging feature parameter that was extracted to the imaging intention.

15. A moving body control system comprising:

a data processing device having circuitry including a processor that is configured to acquire a first moving image which was captured from a first moving body, and generate, from the first moving image, control data corresponding to a route of the first moving body from which the first moving image was captured, the control data being for controlling at least one of movement of a second moving body or imaging from the second moving body; and the second moving body that is controlled to move by the control data, wherein the control data reflects at least one of an imaging intention or an imaging environment input by a user regarding a second moving image to be captured from the second moving body, the circuitry is further configured to estimate, from the first moving image, movement data of the first moving body including the route of the first moving body, and the control data is generated by modifying, according to the imaging environment, the movement data that was estimated.

* * * * *